United States Patent
Ling et al.

(10) Patent No.: US 9,647,733 B2
(45) Date of Patent: May 9, 2017

(54) CODING SCHEME FOR A WIRELESS COMMUNICATION SYSTEM

(71) Applicant: QUALCOMM Incorporated, San Diego, CA (US)

(72) Inventors: Fuyun Ling, San Diego, CA (US); J. Rodney Walton, Carlisle, MA (US); Mark Wallace, Bedford, MA (US); Ivan Fernandez, Lleida (ES); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/885,787

(22) Filed: Oct. 16, 2015

(65) Prior Publication Data

US 2016/0043784 A1    Feb. 11, 2016

Related U.S. Application Data

(63) Continuation of application No. 11/208,263, filed on Aug. 18, 2005, now Pat. No. 9,319,114, which is a
(Continued)

(51) Int. Cl.
*H04B 7/02* (2006.01)
*H04B 7/0417* (2017.01)
(Continued)

(52) U.S. Cl.
CPC ......... *H04B 7/0417* (2013.01); *H04B 7/0632* (2013.01); *H04L 1/005* (2013.01);
(Continued)

(58) Field of Classification Search
None
See application file for complete search history.

(56) References Cited

U.S. PATENT DOCUMENTS

| | | |
|---|---|---|
| 5,197,061 A | 3/1993 | Halbert-Lassalle et al. |
| 5,309,474 A | 5/1994 | Gilhousen et al. |

(Continued)

FOREIGN PATENT DOCUMENTS

| | | |
|---|---|---|
| CN | 1213232 | 4/1999 |
| CN | 1245310 A | 2/2000 |

(Continued)

OTHER PUBLICATIONS

Babak Hassibi, et al., "High-Rate Codes that are Linear in Space and Time," Lucent Technologies, New Jersey, Aug. 22, 2000 (pp. 1-55).
(Continued)

*Primary Examiner* — Adolf Dsouza
(74) *Attorney, Agent, or Firm* — Hyung Myung

(57) ABSTRACT

Coding techniques for a (e.g., OFDM) communication system capable of transmitting data on a number of "transmission channels" at different information bit rates based on the channels' achieved SNR. A base code is used in combination with common or variable puncturing to achieve different coding rates required by the transmission channels. The data (i.e., information bits) for a data transmission is encoded with the base code, and the coded bits for each channel (or group of channels with the similar transmission capabilities) are punctured to achieve the required coding rate. The coded bits may be interleaved (e.g., to combat fading and remove correlation between coded bits in each modulation symbol) prior to puncturing. The unpunctured coded bits are grouped into non-binary symbols and mapped to modulation symbols (e.g., using Gray mapping). The modulation symbol may be "pre-conditioned" and prior to transmission.

32 Claims, 10 Drawing Sheets

Related U.S. Application Data continuation of application No. 09/776,073, filed on Feb. 1, 2001, now Pat. No. 6,961,388.

(51) Int. Cl.
| | |
|---|---|
| *H04B 7/06* | (2006.01) |
| *H04L 1/00* | (2006.01) |
| *H04L 27/34* | (2006.01) |
| *H04L 25/03* | (2006.01) |
| *H04L 5/00* | (2006.01) |

(52) U.S. Cl.
CPC .......... *H04L 1/0009* (2013.01); *H04L 1/0041* (2013.01); *H04L 1/0055* (2013.01); *H04L 1/0066* (2013.01); *H04L 1/0068* (2013.01); *H04L 1/0071* (2013.01); *H04L 5/006* (2013.01); *H04L 5/0046* (2013.01); *H04L 25/03171* (2013.01); *H04L 27/3488* (2013.01); *H04L 5/0023* (2013.01); *H04L 5/0048* (2013.01)

(56) References Cited

U.S. PATENT DOCUMENTS

| | | | |
|---|---|---|---|
| 5,703,911 | A | 12/1997 | Lin et al. |
| 5,812,601 | A | 9/1998 | Schramm |
| 6,005,876 | A | 12/1999 | Cimini, Jr. et al. |
| 6,144,676 | A | 11/2000 | Hamalainen et al. |
| 6,158,041 | A | 12/2000 | Raleigh et al. |
| 6,160,840 | A | 12/2000 | Park |
| 6,289,486 | B1 | 9/2001 | Lee et al. |
| 6,304,991 | B1 | 10/2001 | Rowitch et al. |
| 6,307,168 | B1 | 10/2001 | Newham |
| 6,345,377 | B1 | 2/2002 | Kroeger et al. |
| 6,377,631 | B1 | 4/2002 | Raleigh |
| 6,484,284 | B2 | 11/2002 | Smallcomb |
| 6,507,628 | B1 * | 1/2003 | McCallister ...... H04L 25/03178 375/254 |
| 6,519,732 | B1 | 2/2003 | Li |
| 6,571,366 | B1 | 5/2003 | Doetsch et al. |
| 6,598,200 | B1 | 7/2003 | Greenwood et al. |
| 6,601,214 | B1 | 7/2003 | Hammons, Jr. |
| 6,614,850 | B1 | 9/2003 | Razoumov et al. |
| 6,618,367 | B1 | 9/2003 | Riazi et al. |
| 6,707,856 | B1 | 3/2004 | Gardner et al. |
| 6,732,302 | B1 | 5/2004 | Palenius et al. |
| 6,751,269 | B1 | 6/2004 | Shalvi et al. |
| 6,788,685 | B1 | 9/2004 | Holtzman et al. |
| 6,947,748 | B2 | 9/2005 | Li et al. |
| 6,952,561 | B1 * | 10/2005 | Kumar ............... H04L 25/03171 370/317 |
| 6,961,388 | B2 | 11/2005 | Ling et al. |
| 6,985,434 | B2 | 1/2006 | Wu et al. |
| 2002/0119781 | A1 | 8/2002 | Li et al. |
| 2002/0122383 | A1 * | 9/2002 | Wu ...................... H04B 7/0417 370/210 |
| 2004/0028015 | A1 | 2/2004 | Fouilland et al. |
| 2004/0240590 | A1 | 12/2004 | Cameron et al. |
| 2005/0276344 | A1 | 12/2005 | Ling et al. |
| 2012/0246539 | A1 | 9/2012 | Nguyen |

FOREIGN PATENT DOCUMENTS

| | | |
|---|---|---|
| EP | 0963048 A2 | 12/1999 |
| JP | 6104942 A | 4/1994 |
| JP | 08265295 | 10/1996 |
| JP | 9135275 A | 5/1997 |
| JP | 11163823 A | 6/1999 |
| JP | 20000013356 A | 1/2000 |
| JP | 2000115117 | 4/2000 |
| JP | 2000278240 | 10/2000 |
| WO | WO-8607223 | 12/1986 |
| WO | WO-9809381 A1 | 3/1998 |
| WO | WO-0027085 A1 | 5/2000 |
| WO | WO-0045527 | 8/2000 |
| WO | WO-0057562 A1 | 9/2000 |
| WO | WO-0106662 A1 | 1/2001 |

OTHER PUBLICATIONS

Bingham J.A.C., "Multicarrier modulation for data transmission: An idea whose time has come," Communications Magazine, IEEE vol. 28, Issue 5, pp. 5-14 (May 1990).

cdma2000 (C.S0002-A-1).

International Search Report, PCT/US02/02143—International Search Authority—European Patent Office—Jul. 23, 2002.

Matsuoka et al., "Adaptive Modulation System with Variable Coding Rate Concatenated Code for High Quality Multi-Media Communication Systems", Vehicular Technology Conference, 1996. Mobile Technology for the Human Race., IEEE 46th Atlanta, GA, USA Apr. 28-May 1, 1996, New York, NY, USA, IEEE, US, Apr. 28, 1996 (Apr. 28, 1996), pp. 487-491, XP010162435, ISBN: 0-7803-3157-5.

Muneta et al., "A New Frequency-Domain Link Adaptation Scheme for Broadband OFDM Systems",VTC 1999-Fall. IEEE VTS 50th. Vehicular Technology Conference. Gateway to the 21st Century Communications Village. Amsterdam, Sep. 19-22, 1999, IEEE Vehicular Technology Conference, New York, NY: IEEE, US, vol. 1 Conf. 50, Sep. 1999(Sep. 1999) pp. 253-257, XP000929050.

Sampei et al., "Adaptive Modulation/TDMA Scheme for Large Capacity Personal Multi-Media Communication Systems", IEICE Transactions on Communications, Institute of Electronics Information and Comm. Eng. Tokyo, JP, vol. E77-B No. 9, Sep. 1, 1994 (Sep. 1, 1994) pp. 1096-1103, XP000474107, ISSN:0916-8516.

U.S. Appl. No. 09/205,511 entitled "Turbo Code Interlever Using Linear Congruential Sequence," now allowed. Ling et al., QUALCOMM Incorporated, California (USA).

Wolniansky P.W., et al., "V-Blast: An architecture for realizing very high data rates over the rich-scattering wireless channel," Signals, Systems, and Electronics, 1998. ISSSE 98. 1998 URSI International Symposium, pp. 295-300, (Sep. 29-Oct. 2, 1998), doi: 10.1109/ISSSE.1998.738086.

Yoshiki, T., et al., "A Study on Subcarrier Adaptive Demodulation System using Multilevel Transmission Power Control for OFDM/FDD System," The Institute of Electronics, Information and Communications Engineers general meeting, lecture collection, Japan, Mar. 7, 2000, Communication 1, p. 400.

European Search Report—EP15195476—Search Authority—Munich—Mar. 3, 2016.

Pietrobon S.S,"Implementation and Performance of a Turbo/Map Decoder," International Journal of Satellite Communications, John Wiley and Sons, U.S. 1998,vol. 16, No. 1, pp. 23-46.

\* cited by examiner

CODING SCHEME FOR A WIRELESS COMMUNICATION SYSTEM

CLAIM OF PRIORITY UNDER 35 U.S.C. §120

The present Application for Patent is a continuation of patent application Ser. No. 11/208,263, entitled "CODING SCHEME FOR A WIRELESS COMMUNICATION SYSTEM," filed Aug. 18, 2005, which is a continuation of patent application Ser. No. 09/776,073, entitled "CODING SCHEME FOR A WIRELESS COMMUNICATION SYSTEM," filed Feb. 1, 2001, issued as U.S. Pat. No. 6,961,388, and assigned to the assignee hereof and hereby expressly incorporated by reference herein.

BACKGROUND

I. Field

The present invention relates to data communication. More particularly, the present invention relates to a novel, flexible, and efficient coding scheme for encoding data for transmission on multiple transmission channels with different transmission capabilities.

II. Description of the Related Art

Wireless communication systems are widely deployed to provide various types of communication such as voice, data, and so on. These systems may be based on code division multiple access (CDMA), time division multiple access (TDMA), orthogonal frequency division modulation (OFDM), or some other modulation techniques. OFDM systems may provide high performance for some channel environments.

In an OFDM system, the operating frequency band is effectively partitioned into a number of "frequency subchannels", or frequency bins. Each subchannel is associated with a respective subcarrier upon which data is modulated, and may be viewed as an independent "transmission channel". Typically, the data to be transmitted (i.e., the information bits) is encoded with a particular coding scheme to generate coded bits. For a high-order modulation scheme (e.g., QPSK, QAM, and so on), the coded bits are grouped into non-binary symbols that are then used to modulate the subcarriers.

The frequency subchannels of an OFDM system may experience different link conditions (e.g., different fading and multipath effects) and may achieve different signal-to-noise-plus-interference ratio (SNR). Consequently, the number of information bits per modulation symbol (i.e., the information bit rate) that may be transmitted on each subchannel for a particular level of performance may be different from subchannel to subchannel. Moreover, the link conditions typically vary with time. As a result, the supported bit rates for the subchannels also vary with time.

The different transmission capabilities of the frequency subchannels plus the time-variant nature of the capabilities make it challenging to provide an effective coding scheme capable of encoding the supported number of information bits/modulation symbol to provide the required coded bits for the subchannels.

Accordingly, a high performance, efficient, and flexible coding scheme that may be used to encode data for transmission on multiple subchannels with different transmission capabilities is highly desirable.

SUMMARY

Various aspects of the present invention provides efficient and effective coding techniques for a communication system capable of transmitting data on a number of "transmission channels" at different information bit rates based on the channels' achieved SNR. A number of coding/puncturing schemes may be used to generate the required coded bits (i.e., the information, tail, and parity bits, if a Turbo code is used). In a first coding/puncturing scheme, a particular base code and common puncturing is used for all transmission channels (e.g., all frequency subchannels in an OFDM system, or spatial subchannels of all frequency subchannels in an OFDM system with multiple input/multiple output antennas (MIMO), as described below). In a second coding/puncturing scheme, the same base code but variable puncturing is used for the transmission channels. The variable puncturing can be used to provide different coding rates for the transmission channels. The coding rate for each transmission channel is dependent on the information bit rate and the modulation scheme selected for the channel.

An embodiment of the invention provides a method for preparing data for transmission on a number of transmission channels in a communication system, e.g., an orthogonal frequency division modulation (OFDM) system. Each transmission channel is operable to transmit a respective sequence of modulation symbols. In accordance with the method, the number of information bits per modulation symbol supported by each transmission channel is determined (e.g., based on the channel's SNR). A modulation scheme is then identified for each transmission channel such that the determined number of information bits per modulation symbol is supported. Based on the supported number of information bits per modulation symbol and the identified modulation scheme, the coding rate for each transmission channel is determined. At least two transmission channels are associated with different coding rates because of different transmission capabilities.

Thereafter, a number of information bits is encoded in accordance with a particular encoding scheme to provide a number of coded bits. If a Turbo code is used, a number of tail and parity bits are generated for the information bits (the coded bits include the information bits, tail bits, and parity bits). The coded bits may be interleaved in accordance with a particular interleaving scheme. For ease of implementation, the interleaving may be performed prior to puncturing. The coded bits (e.g., the tail and parity bits, if a Turbo code is used) are then punctured in accordance with a particular puncturing scheme to provide a number of unpunctured coded bits for the transmission channels. The puncturing is adjusted to achieve different coding rates needed by the transmission channels. As an alternative, the puncturing may also be performed prior to interleaving.

Non-binary symbols are then formed for the transmission channels. Each non-binary symbol includes a group of interleaved and unpunctured coded bits and is mapped a respective modulation symbol. The specific number of coded bits in each non-binary symbol is dependent on the channel's modulation scheme. For a multiple-input multiple-output (MIMO) system capable of transmitting on a number of spatial subchannels for each frequency subchannel, the modulation symbols for each frequency subchannel may be pre-conditioned prior to transmission, as described below.

The invention provides methods and system elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION OF THE SPECIFIC EMBODIMENTS

Figure 1:
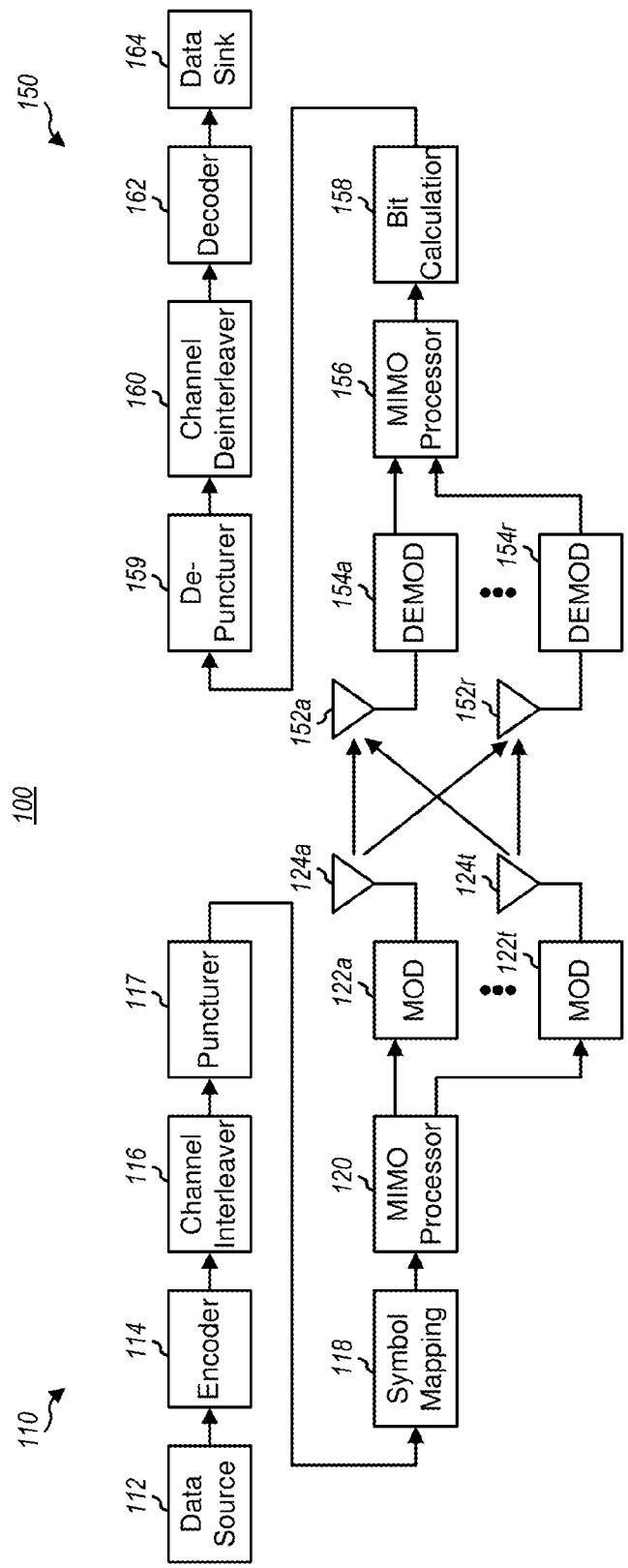
FIG. 1 is a diagram of a multiple-input multiple-output (MIMO) communication system capable of implementing various aspects and embodiments of the invention.

FIG. 1 is a diagram of a multiple-input multiple-output (MIMO) communication system 100 capable of implementing various aspects and embodiments of the invention. Communication system 100 can be designed to implement the coding schemes described herein. System 100 can further be operated to employ a combination of antenna, frequency, and temporal diversity to increase spectral efficiency, improve performance, and enhance flexibility. Increased spectral efficiency is characterized by the ability to transmit more bits per second per Hertz (bps/Hz) when and where possible to better utilize the available system bandwidth. Improved performance may be quantified, for example, by a lower bit-error-rate (BER) or frame-error-rate (FER) for a given link signal-to-noise-plus-interference ratio (SNR). And enhanced flexibility is characterized by the ability to accommodate multiple users having different and typically disparate requirements. These goals may be achieved, in part, by employing a high performance and efficient coding scheme, multi-carrier modulation, time division multiplexing (TDM), multiple transmit and/or receive antennas, other techniques, or a combination thereof. The features, aspects, and advantages of the invention are described in further detail below.

As shown in FIG. 1, communication system 100 includes a first system 110 in communication with a second system 150. Within system 110, a data source 112 provides data (i.e., information bits) to an encoder 114 that encodes the data in accordance with a particular coding scheme. The encoding increases the reliability of the data transmission. The coded bits are then provided to a channel interleaver 116 and interleaved (i.e., reordered) in accordance with a particular interleaving scheme. The interleaving provides time and frequency diversity for the coded bits, permits the data to be transmitted based on an average SNR for the subchannels used for the data transmission, combats fading, and further removes correlation between coded bits used to form each modulation symbol, as described below. The interleaved bits are then punctured (i.e., deleted) to provide the required number of coded bits. The encoding, channel interleaving, and puncturing are described in further detail below. The unpunctured coded bits are then provided to a symbol mapping element 118.

In an OFDM system, the operating frequency band is effectively partitioned into a number of "frequency subchannels" (i.e., frequency bins). At each "time slot" (i.e., a particular time interval that may be dependent on the bandwidth of the frequency subchannel), a "modulation symbol" may be transmitted on each frequency subchannel. As described in further detail below, the OFDM system may be operated in a MIMO mode in which multiple ($N_T$) transmit antennas and multiple ($N_R$) receive antennas are used for a data transmission. The MIMO channel may be decomposed into $N_C$ independent channels, with $N_C \leq N_T$ and $N_C \leq N_R$. Each of the $N_C$ independent channels is also referred to as a "spatial subchannel" of the MIMO channel, which corresponds to a dimension. In the MIMO mode, increased dimensionality is achieved and $N_C$ modulation symbols may be transmitted on $N_C$ spatial subchannels of each frequency subchannel at each time slot. In an OFDM system not operated in the MIMO mode, there is only one spatial subchannel. Each frequency subchannel/spatial subchannel may also be referred to as a "transmission channel". The MIMO mode and spatial subchannel are described in further detail below.

The number of information bits that may be transmitted for each modulation symbol for a particular level of performance is dependent on the SNR of the transmission channel. For each transmission channel, symbol mapping element 118 groups a set of unpunctured coded bits to form a non-binary symbol for that transmission channel. The non-binary symbol is then mapped to a modulation symbol, which represents a point in a signal constellation corresponding to the modulation scheme selected for the transmission channel. The bit grouping and symbol mapping are performed for all transmission channels, and for each time slot used for data transmission. The modulation symbols for all transmission channels are then provided to a MIMO processor 120.

Depending on the particular "spatial" diversity being implemented (if any), MIMO processor 120 may demultiplex, pre-condition, and combine the received modulation symbols. The MIMO processing is described in further detail below. For each transmit antenna, MIMO processor 120 provides a stream of modulation symbol vectors, one vector for each time slot. Each modulation symbol vector includes the modulation symbols for all frequency subchannels for a given time slot. Each stream of modulation symbol vectors is received and modulated by a respective modulator (MOD) 122, and transmitted via an associated antenna 124.

In the embodiment shown in FIG. 1, receiving system 150 includes a number of receive antennas 152 that receive the transmitted signals and provide the received signals to respective demodulators (DEMOD) 154. Each demodulator 154 performs processing complementary to that performed at modulator 122. The demodulated symbols from all demodulators 154 are provided to a MIMO processor 156 and processed in a complementary manner as that performed at MIMO processor 120. The received symbols for the transmission channels are then provided to a bit calculation unit 158 that performs processing complementary to that performed by symbol mapping element 118 and provides values indicative of the received bits. Erasures (e.g., zero value indicatives) are then inserted by a de-puncturer 159 for coded bits punctured at system 110. The de-punctured values are then deinterleaved by a channel deinterleaver 160 and further decoded by a decoder 162 to generate decoded bits, which are then provided to a data sink 164. The channel deinterleaving, de-puncturing, and decoding are complementary to the channel interleaving, puncturing, and encoding performed at the transmitter.

Figure 2:
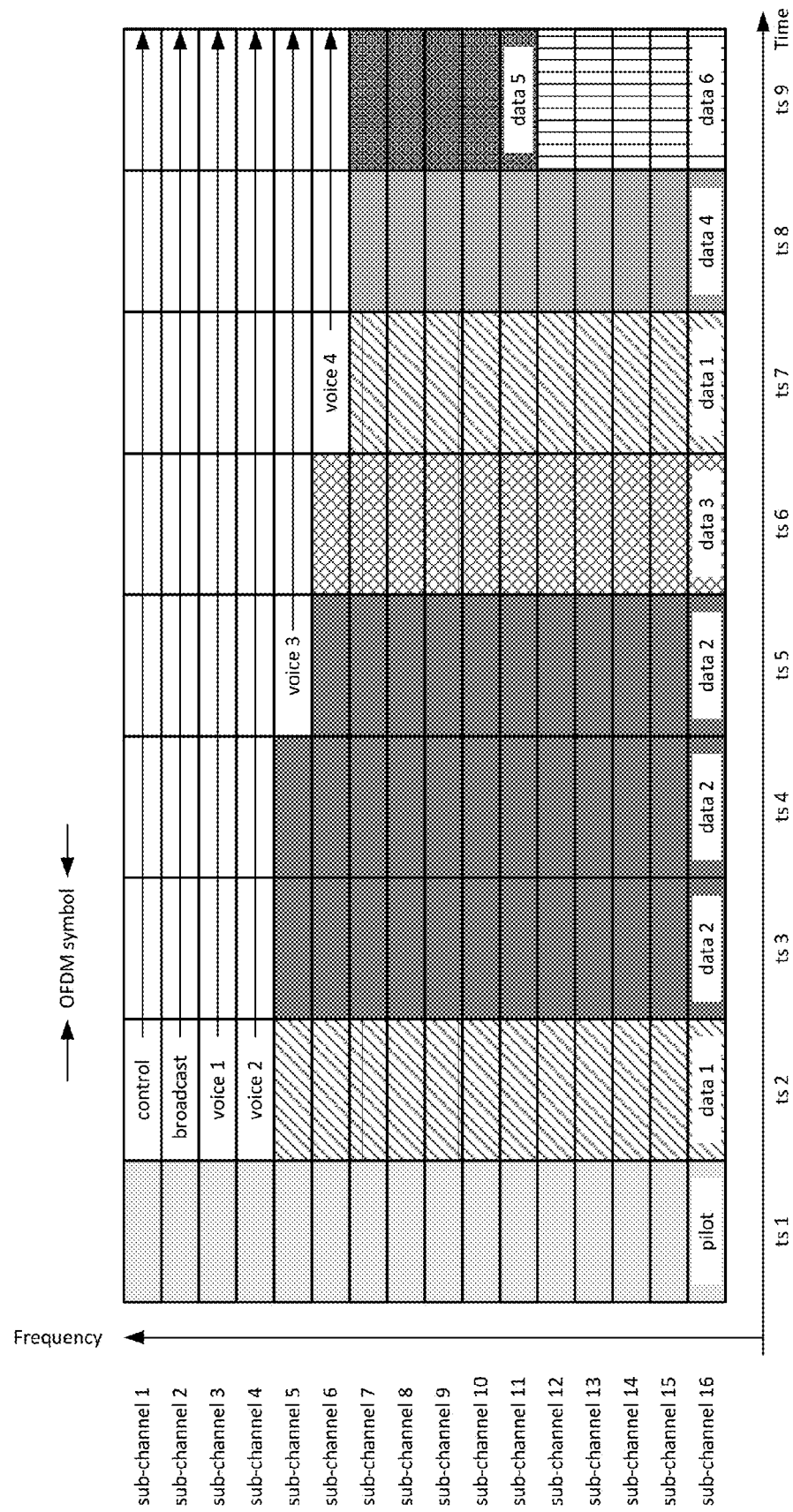
FIG. 2 is a diagram that graphically illustrates an OFDM transmission from one of $N_T$ transmit antennas in the MIMO system.

FIG. 2 is a diagram that graphically illustrates an OFDM transmission from one of $N_T$ transmit antennas in a MIMO system. In FIG. 2, the horizontal axis represents time and the vertical axis represents frequency. In this specific example, the transmission channel includes 16 frequency subchannels and is used to transmit a sequence of OFDM symbols, with each OFDM symbol covering all 16 frequency subchannels. A time division multiplexing (TDM) structure is also illustrated in which the data transmission is partitioned into time slots, with each time slot having a particular duration. For the example shown in FIG. 2, the time slot is equal to the length of one modulation symbol.

The available frequency subchannels may be used to transmit signaling, voice, packet data, and so on. In the specific example shown in FIG. 2, the modulation symbol at time slot 1 corresponds to pilot data, which may be periodically transmitted to assist the receiver units synchronize and perform channel estimation. Other techniques for distributing pilot data over time and frequency may also be used. Transmission of the pilot modulation symbol typically occurs at a particular rate, which is usually selected to be fast enough to permit accurate tracking of variations in the communication link.

The time slots not used for pilot transmissions can be used to transmit various types of data. For example, frequency subchannels 1 and 2 may be reserved for the transmission of control and broadcast data to the receiver units. The data on these subchannels is generally intended to be received by all receiver units. However, some of the messages on the control channel may be user specific, and may be encoded accordingly.

Voice data and packet data may be transmitted in the remaining frequency subchannels. For the example shown, subchannel 3 at time slots 2 through 9 is used for voice call 1, subchannel 4 at time slots 2 through 9 is used for voice call 2, subchannel 5 at time slots 5 through 9 is used for voice call 3, and subchannel 6 at time slots 7 through 9 is used for voice call 5.

The remaining available frequency subchannels and time slots may be used for transmissions of traffic data. A particular data transmission may occur over multiple subchannels and/or multiple time slots, and multiple data transmissions may occur within any particular time slot. A data transmission may also occur over non-contiguous time slots.

In the example shown in FIG. 2, data 1 transmission uses frequency subchannels 5 through 16 at time slot 2 and subchannels 7 through 16 at time slot 7, data 2 transmission uses subchannels 5 through 16 at time slots 3 and 4 and subchannels 6 through 16 at time slots 5, data 3 transmission uses subchannels 6 through 16 at time slot 6, data 4 transmission uses subchannels 7 through 16 at time slot 8, data 5 transmission uses subchannels 7 through 11 at time slot 9, and data 6 transmission uses subchannels 12 through 16 at time slot 9. Data 1 through 6 transmissions can represent transmissions of traffic data to one or more receiver units.

To provide the transmission flexibility and achieve high performance and efficiency, each frequency subchannel at each time slot for each transmit antenna may be viewed as an independent unit of transmission (a modulation symbol) that may be used to transmit any type of data such as pilot, signaling, broadcast, voice, traffic data, some other data type, or a combination thereof. Flexibility, performance, and efficiency may further be achieved by allowing for independence among the modulation symbols, as described below. For example, each modulation symbol may be generated from a modulation scheme (e.g., M-PSK, M-QAM, or some other scheme) that results in the best use of the resource at that particular time, frequency, and space.

MIMO System

In a terrestrial communications system (e.g., a cellular system, a broadcast system, a multi-channel multi-point distribution system (MMDS) system, and others), an RF modulated signal from a transmitter unit may reach the receiver unit via a number of transmission paths. The characteristics of the transmission paths typically vary over time due to a number of factors. If more than one transmit or receive antenna is used, and if the transmission paths between the transmit and receive antennas are linearly independent (i.e., one transmission is not formed as a linear combination of the other transmissions), which is generally true to at least an extent, then the likelihood of correctly receiving the transmitted signal increases as the number of antennas increases. Generally, as the number of transmit and receive antennas increases, diversity increases and performance improves.

A MIMO communication system such as the one shown in FIG. 1 employs antennas at both the transmit and receive ends of the communication link. These transmit and receive antennas may be used to provide various forms of "spatial diversity", including "transmit" diversity and "receive" diversity. Spatial diversity is characterized by the use of multiple transmit antennas and one or more receive antennas. Transmit diversity is characterized by the transmission of data over multiple transmit antennas. Typically, additional processing is performed on the data transmitted from the transmit antennas to achieved the desired diversity. For example, the data transmitted from different transmit antennas may be delayed or reordered in time, coded and interleaved across the available transmit antennas, and so on. Receive diversity is characterized by the reception of the transmitted signals on multiple receive antennas, and diversity is achieved by simply receiving the signals via different signal paths.

Spatial diversity may be used to improve the reliability of the communication link with or without increasing the link capacity. This may be achieved by transmitting or receiving data over multiple paths via multiple antennas. Spatial diversity may be dynamically selected based on the characteristics of the communication link to provide the required performance. For example, higher degree of spatial diversity may be provided for some types of communication (e.g., signaling), for some types of services (e.g., voice), for some communication link characteristics (e.g., low SNR), or for some other conditions or considerations.

The data may be transmitted from multiple antennas and/or on multiple frequency subchannels to obtain the desired diversity. For example, data may be transmitted on: (1) one subchannel from one antenna, (2) one subchannel (e.g., subchannel 1) from multiple antennas, (3) one subchannel from all $N_T$ antennas, (4) a set of subchannels (e.g., subchannels 1 and 2) from one antenna, (5), a set of subchannels from multiple antennas, (6) a set of subchannels from all $N_T$ antennas, or (7) a set of channels from a set of antennas (e.g., subchannel 1 from antennas 1 and 2 at one time slot, subchannels 1 and 2 from antenna 2 at another time slot, and so on). Thus, any combination of subchannels and antennas may be used to provide antenna and frequency diversity.

In the MIMO communication system, the multi-input multi-output channel can be decomposed into a set of $N_C$ independent spatial subchannels. The number of such spatial subchannels is less than or equal to the lesser of the number of the transmitting antennas and the number of receiving antennas (i.e., $N_C \leq N_T$ and $N_C \leq N_R$). If H is the $N_R \times N_T$ matrix that gives the channel response for the $N_T$ transmit antennas and the $N_R$ receive antennas at a specific time, and $\underline{x}$ is the $N_T$-vector inputs to the channel, then the received signal can be expressed as:

$$\underline{y} = H\underline{x} + \underline{n},$$

where $\underline{n}$ is an $N_R$-vector representing noise plus interference. In one embodiment, the eigenvector decomposition of the Hermitian matrix formed by the product of the channel matrix with its conjugate-transpose can be expressed as:

$$H^*H = E\Lambda E^*,$$

where the symbol "*" denotes conjugate-transpose, E is the eigenvector matrix, and $\Lambda$ is a diagonal matrix of eigenvalues, both of dimension $N_T \times N_T$.

The transmitter converts (i.e., pre-conditions) a set of $N_T$ modulation symbols $\underline{b}$ using the eigenvector matrix E. The transmitted modulation symbols from the $N_T$ transmit antennas can be expressed as:

$$\underline{x} = E\underline{b}.$$

For all antennas, the pre-conditioning of the modulation symbols can be achieved by a matrix multiply operation expressed as:

$$\begin{bmatrix} x_1 \\ x_2 \\ \vdots \\ x_{N_T} \end{bmatrix} = \begin{bmatrix} e_{11}, & e_{12}, & & e_{1N_T} \\ e_{21}, & e_{22}, & & e_{2N_T} \\ & & & \\ e_{N_T 1}, & e_{N_T 1}, & & e_{N_T N_T} \end{bmatrix} \cdot \begin{bmatrix} b_1 \\ b_2 \\ \vdots \\ b_{N_T} \end{bmatrix} \quad \text{Eq (1)}$$

where $b_1, b_2, \ldots$ and $b_{N_T}$ are respectively the modulation symbols for a particular frequency subchannel at transmit antennas $1, 2, \ldots N_T$, where each modulation symbol can be generated using, for example, M-PSK, M-QAM, and so on, as described below; E= is the eigenvector matrix related to the transmission characteristics from transmit antennas to the receive antennas; and $x_1, x_2, \ldots x_{N_T}$ are the pre-conditioned modulation symbols, which can be expressed as:

$$x_1 = b_1 \cdot e_{11} + b_2 \cdot e_{12} + \ldots + b_{N_T} \cdot e_{1N_T},$$

$$x_2 = b_1 \cdot e_{21} + b_2 \cdot e_{22} + \ldots + b_{N_T} \cdot e_{2N_T}, \text{ and}$$

$$x_{N_T} = b_1 \cdot e_{N_T 1} + b_2 \cdot e_{N_T 2} + \ldots + b_{N_T} \cdot e_{N_T N_T}.$$

The received signal may be expressed as:

$$\underline{y} = HE\underline{b} + \underline{n}.$$

The receiver performs a channel-matched-filter operation, followed by multiplication by the right eigenvectors. The result of the channel-matched-filter operation is the vector $\underline{z}$, which can be expressed as:

$$\underline{z} = E^*H^*HE\underline{b} + E^*H^*\underline{n} = \Lambda\underline{b} + \underline{\hat{n}},$$

where the new noise term has covariance that can be expressed as:

$$E(\underline{\hat{n}}\underline{\hat{n}}^*) = E(E^*H^*\underline{n}\underline{n}^*HE) = E^*H^*HE = \Lambda, \text{ i.e.,}$$

the noise components are independent and have variance given by the eigenvalues. The SNR of the $i^{th}$ component of $\underline{z}$ is $\lambda_i$, the $i^{th}$ diagonal element of $\Lambda$.

An embodiment of the MIMO processing is described in further detail below and in U.S. patent application Ser. No. 09/532,491, entitled "HIGH EFFICIENCY, HIGH PERFORMANCE COMMUNICATIONS SYSTEM EMPLOYING MULTI-CARRIER MODULATION," filed Mar. 22, 2000, assigned to the assignee of the present application and incorporated herein by reference.

Each of the $N_C$ spatial subchannels in the MIMO channel as described in the above embodiment is also referred to as an eigenmode if these channels are independent of each other. For the MIMO mode, one modulation symbol can be transmitted on each of the eigenmodes in each frequency subchannel. Since the SNR may be different for each eigenmode, the number of bits that may be transmitted over each eigenmode may also be different. As noted above, each eigenmode of each frequency subchannel is also referred to as a transmission channel.

In other embodiments, the spatial subchannels can be created differently. For example, a spatial subchannel can be defined as the transmissions from one transmitter antenna to all of the receiver antennas.

As used herein, the MIMO mode includes full channel state information (full-CSI) and partial-CSI processing modes. For both full-CSI and partial-CSI, additional transmission paths are provided via spatially separable subchannels. Full-CSI processing utilizes eigenmodes, as described above. Partial-CSI processing does not utilize eigenmodes, and may involve providing to the transmitter unit (e.g., via feeding back on the reverse link) the SNR for each transmission channel (i.e., receive diversity port), and coding accordingly based on the received SNR.

A number of formulations may be utilized at the receiver unit to provide the requisite information for partial-CSI, including linear and non-linear forms of zero-forcing, channel correlation matrix inversion (CCMI), and minimum mean square error (MMSE), as is known in the art. For example, the derivation of SNRs for a non-linear zero-forcing (partial-CSI) MIMO case is described by P. W. Wolniansky et al. in a paper entitled "V-BLAST: An Architecture for Realizing Very High Data Rates Over the Rich-Scattering Wireless Channel," Proc. IEEE ISSSE-98, Pisa, Italy, Sep. 30, 1998, and incorporated herein by reference. The eigenvalues from a MIMO formulation are related to the SNRs of the eigenmodes for the full-CSI case. Non-MIMO cases can use an assortment of methods, as is known in the art.

Each transmission channel is associated with a SNR that may be known to both the transmitter and receiver. In this case, the modulation and coding parameters of each modulation symbol can be determined based on the SNR of the corresponding transmission channel. This allows for efficient use of the available frequency subchannels and eigenmodes.

Table 1 lists the number of information bits that may be transmitted in each modulation symbol for a particular level of performance (e.g., 1% frame-error rate, or % FER) for various SNR ranges. For each SNR range, Table 1 also lists a particular modulation scheme selected for use with that SNR range, the number of coded bits that may be transmitted for each modulation symbol for the selected modulation scheme, and the coding rate used to obtain the required number of coded bits/modulation symbol given the supported number of information bits/modulation symbol.

Table 1 lists one combination of modulation scheme and coding rate for each SNR range. The supported bit rate for each transmission channel may be achieved using any one of a number of possible combinations of coding rate and modulation scheme. For example, one information bit per symbol may be achieved using (1) a coding rate of ½ and QPSK modulation, (2) a coding rate of ⅓ and 8-PSK modulation, (3) a coding rate of ¼ and 16-QAM, or (4) some other combination of coding rate and modulation scheme. In Table 1, QPSK, 16-QAM, and 64-QAM are used for the listed SNR ranges. Other modulation schemes such as 8-PSK, 32-QAM, 128-QAM, and so on, may also be employed and are within the scope of the invention.

TABLE 1

| SNR Range | # of Information Bits/Symbol | Modulation Symbol | # of Coded Bits/Symbol | Coding Rate |
|---|---|---|---|---|
| 1.5-4.4 | 1 | QPSK | 2 | 1/2 |
| 4.4-6.4 | 1.5 | QPSK | 2 | 3/4 |
| 6.4-8.35 | 2 | 16-QAM | 4 | 1/2 |
| 8.35-10.4 | 2.5 | 16-QAM | 4 | 5/8 |
| 10.4-12.3 | 3 | 16-QAM | 4 | 3/4 |
| 12.3-14.15 | 3.5 | 64-QAM | 6 | 7/12 |
| 14.15-15.55 | 4 | 64-QAM | 6 | 2/3 |
| 15.55-17.35 | 4.5 | 64-QAM | 6 | 3/4 |
| >17.35 | 5 | 64-QAM | 6 | 5/6 |

For clarity, various aspects of the invention are described for an OFDM system and, in many instances, for an OFDM system operating in a MIMO mode. However, the encoding and processing techniques described herein may generally be applied to various communication systems such as, for example, (1) an OFDM system operating without MIMO, (2) a MIMO system operating without OFDM (i.e., operating based on a single frequency subchannel, i.e., a single RF carrier, but multiple spatial subchannels), (3) a MIMO system operating with OFDM, and (4) others. OFDM is simply one technique for subdividing a wideband channel into a number of orthogonal frequency subchannels.

Encoding

Figure 3A:
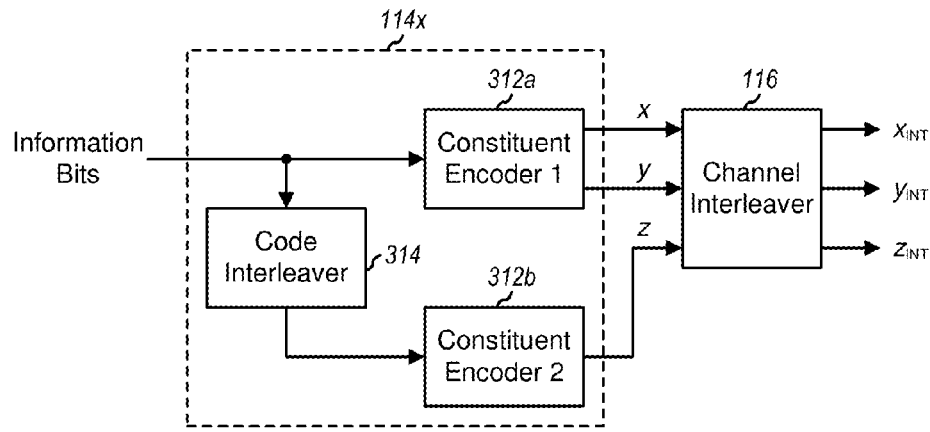
FIGS. 3A and 3B are diagrams of a parallel concatenated convolutional encoder.

FIG. 3A is a block diagram of an embodiment of a parallel concatenated convolutional encoder 114x, which is often referred to as a Turbo encoder. Turbo encoder 114x represents one implementation of the forward error correction (FEC) portion of encoder 114 in FIG. 1 and may be used to encode data for transmission over one or more transmission channels.

The encoding within encoder 114 may include error correction coding or error detection coding, or both, which are used to increase the reliability of the link. The encoding may include, for example, cyclic redundancy check (CRC) coding, convolutional coding, Turbo coding, Trellis coding, block coding (e.g., Reed-Solomon coding), other types of coding, or a combination thereof. For a wireless communication system, a packet of data may be initially encoded with a particular CRC code, and the CRC bits are appended to the data packet. Additional overhead bits may also be appended to the data packet to form a formatted data packet, which is then encoded with a convolutional or Turbo code. As used herein, "information bits" refer to bits provided to the convolutional or Turbo encoder, including transmitted data bits and bits used to provide error detection or correction capability for the transmitted bits.

As shown in FIG. 3A, Turbo encoder 114x includes two constituent encoders 312a and 312b, and a code interleaver 314. Constituent encoder 312a receives and encodes the information bits, x, in accordance with a first constituent code to generate a first sequence of tail and parity bits, y. Code interleaver 314 receives and interleaves the information bits in accordance with a particular interleaving scheme. Constituent encoder 312b receives and encodes the interleaved bits in accordance with a second constituent code to generate a second sequence of tail and parity bits, z. The information bits, tail bits, and parity bits from encoders 312a and 312b are provided to the next processing element (channel interleaver 116).

Figure 3C:
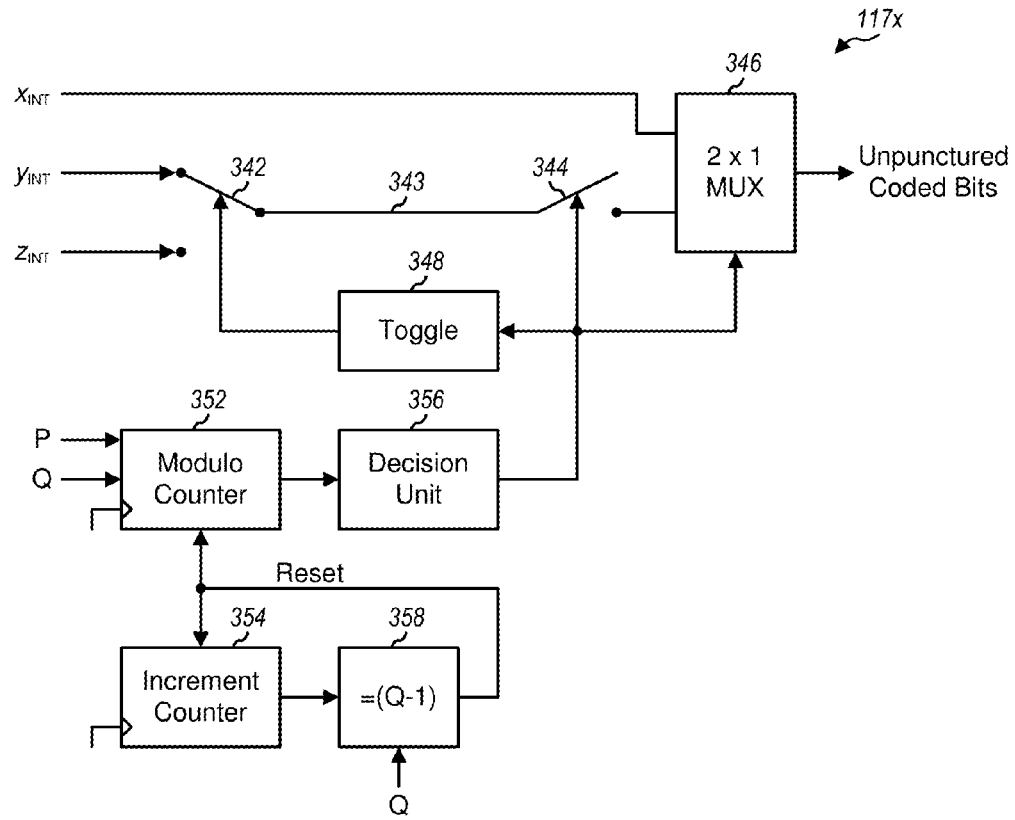
FIG. 3C is a diagram of an embodiment of a puncturer and multiplexer, which may be used to provide variable puncturing of coded bits.
Figure 3B:
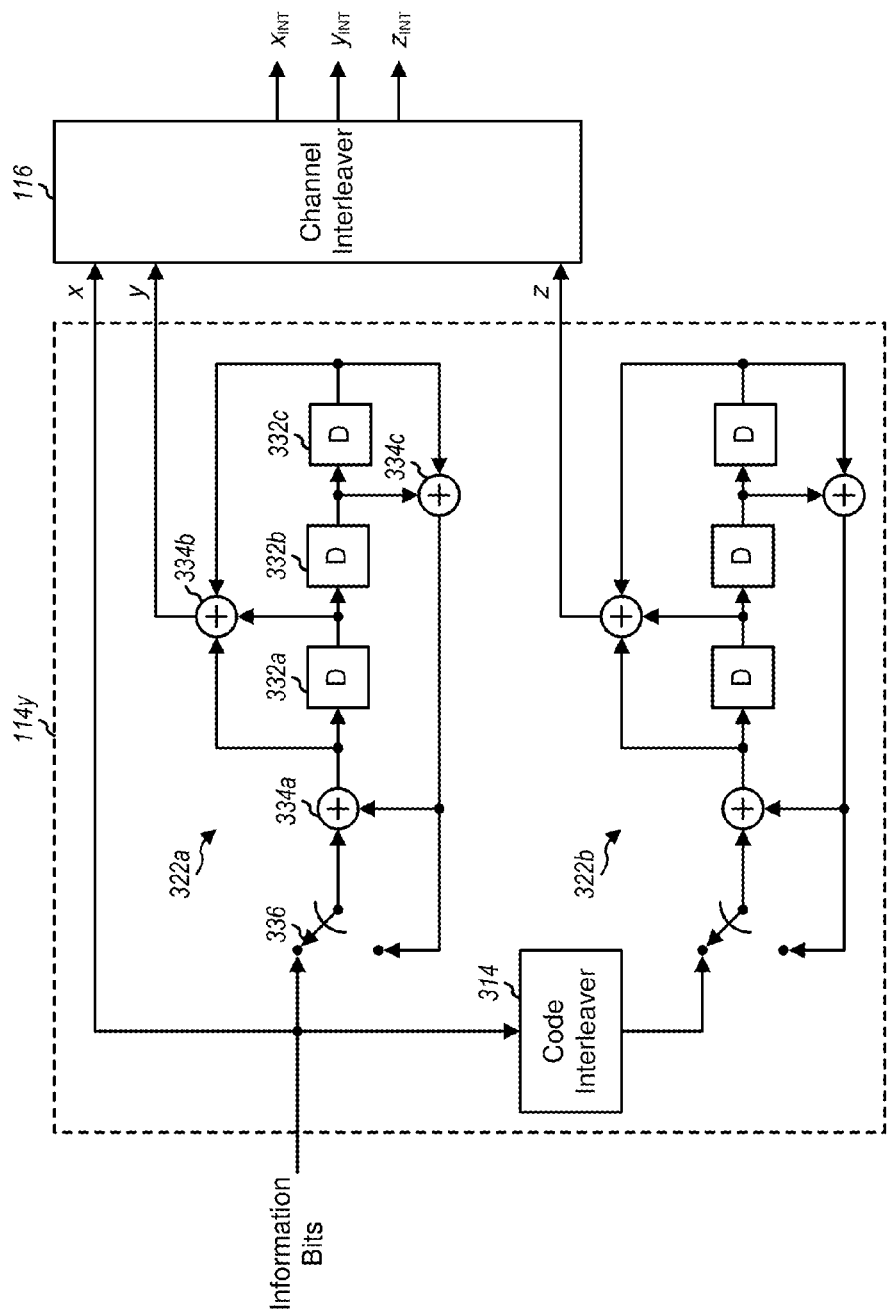

FIG. 3B is a diagram of an embodiment of a Turbo encoder 114y, which is one implementation of Turbo encoder 114x and may also be used within encoder 114 in FIG. 1. In this example, Turbo encoder 114y is a rate ⅓ encoder that provides two parity bits, y and z, for each information bit x.

In the embodiment shown in FIG. 3B, each constituent encoder 322 of Turbo encoder 114y implements the following transfer function for the constituent code:

$$G(D) = \left[ 1 \quad \frac{n(D)}{d(D)} \right],$$

where $n(D)=1+D+D^3$, and $d(D)=1+D^2+D^3$

Other constituent codes may also be used and are within the scope of the invention.

Each constituent encoder 322 includes a number of series coupled delay elements 332, a number of modulo-2 adders 334, and a switch 336. Initially, the states of delay elements 332 are set to zeros and switch 336 is in the up position. Then, for each information bit in a data packet, adder 334a performs modulo-2 addition of the information bit with the output bit from adder 334c and provides the result to delay element 332a. Adder 334b receives and performs modulo-2 addition of the bits from adder 334a and delay elements 332a and 332c, and provides the parity bit y. Adder 334c performs modulo-2 addition of the bits from delay elements 332b and 332c.

After all N information bits in the data packet have been encoded, switch 336 is moved to the down position and three zero ("0") bits are provided to the constituent encoder 322a. Constituent encoder 322a then encodes the three zero bits and provides three tail systematic bits and three tail parity bits.

For each packet of N information bits, constituent encoder 322a provides N information bits x, the first three tail systematic bits, N parity bits y, and the first three tail parity bits, and constituent encoder 322b provides the second three tail systematic bits, N parity bits z, and the last three tail parity bits. For each packet, encoder 114y provides N information bits, six tail systematic bits, N+3 parity bits from encoder 322a, and N+3 parity bits from encoder 322b.

Code interleaver 314 may implement any one of a number of interleaving schemes. In one specific interleaving scheme, the N information bits in the packet are written, by row, into a $2^5$-row by $2^n$-column array, where n is the smallest integer such that $N \leq 2^{5+n}$. The rows are then shuffled according to a bit-reversal rule. For example, row 1 ("00001") is swapped with row 16 ("10000"), row 3 ("00011") is swapped with row 24 ("11000"), and so on. The bits within each row are then permutated (i.e., rearranged) according to a row-specific linear congruential sequence (LCS). The LCS for row k may be defined as $x_k(i+1)=\{x_k(i)+c_k\} \mod 2^n$, where i=0, 1, ... $2^n-1$, $x_k(0)=c_k$, and $c_k$ is a specific value selected for each row and is further dependent on the value for n. For permutation in each row, the $i^{th}$ bit in the row is placed in location x(i). The bits in code interleaver 314 are then read out by column.

The above LCS code interleaving scheme is described in further detail in commonly assigned U.S. patent application Ser. No. 09/205,511, entitled "TURBO CODE INTERLEAVER USING LINEAR CONGRUENTIAL SEQUENCES," filed Dec. 4, 1998, and in a document entitled "C.S0002-A-1 Physical Layer Standard for cdma2000 Spread Spectrum Systems" (hereinafter referred to as the cdma2000 standard), both of which are incorporated herein by reference.

Other code interleaver may also be used and are within the scope of the invention. For example, a random interleaver or a symmetrical-random (S-random) interleaver may also be used instead of the linear congruential sequence interleaver described above.

For clarity, the data coding is specifically described based on a Turbo code. Other coding schemes may also be used and are within the scope of the invention. For example, the data may be coded with a convolutional code, a block code, a concatenated code comprised of a combination of block, convolutional, and/or Turbo codes, or some other code. The data may be coded in accordance with a "base" code, and the coded bits may thereafter be processed (e.g., punctured) based on the capabilities of the transmission channels used to transmit the data.

Channel Interleaving

Referring back to FIG. 1, the coded bits from encoder 114 are interleaved by channel interleaver 116 to provide temporal and frequency diversity against deleterious path effects (e.g., fading). Moreover, since coded bits are subsequently grouped together to form non-binary symbols that are then mapped to modulation symbols, the interleaving further ensures that the coded bits that form each modulation symbol are not located close to each other (temporally). For static additive white Gaussian noise (AWGN) channels, the channel interleaving is less critical when a Turbo encoder is also employed, since the code interleaver effectively performs similar functions.

Various interleaving schemes may be used for the channel interleaver. In one interleaving scheme, the coded bits (i.e., the information, tail, and parity bits) for each packet are written (linearly) to rows of memory. The bits in each row may then be permutated (i.e., rearranged) based on (1) a bit-reversal rule, (2) a linear congruential sequence (such as the one described above for the code interleaver), (3) a randomly generated pattern, (4) or a permutation pattern generated in some other manner. The rows are also permutated in accordance with a particular row permutation pattern. The permutated coded bits are then retrieved from each column and provided to puncturer 117.

In an embodiment, the channel interleaving is performed individually for each bit stream in a packet. For each packet, the information bits x, the tail and parity bits y from the first constituent encoder, and the tail and parity bits z from the second constituent encoder may be interleaved by three separate interleavers, which may employ the same or different channel interleaving schemes. This separate interleaving allows for flexible puncturing on the individual bit streams.

The interleaving interval may be selected to provide the desired temporal and frequency diversity. For example, coded bits for a particular time period (e.g., 10 msec, 20 msec, or some other) and/or for a particular number of transmission channels may be interleaved.

Puncturing

As noted above, for an OFDM communication system, the number of information bits that may be transmitted for each modulation symbol is dependent on the SNR of the transmission channel used to transmit the modulation symbol. And for an OFDM system operated in the MIMO mode, the number of information bits that may be transmitted for each modulation symbol is dependent on the SNR of the frequency subchannel and spatial subchannel used to transmit the modulation symbol.

In accordance with an aspect of the invention, a number of coding/puncturing schemes may be used to generate the coded bits (i.e., information, tail, and parity bits) for transmission. In a first coding/puncturing scheme, a particular base code and common puncturing is applied for all transmission channels. In a second coding/puncturing scheme, the same base code but variable puncturing is applied for the transmission channels. The variable puncturing is dependent on the SNR of the transmission channels.

Figure 4A:
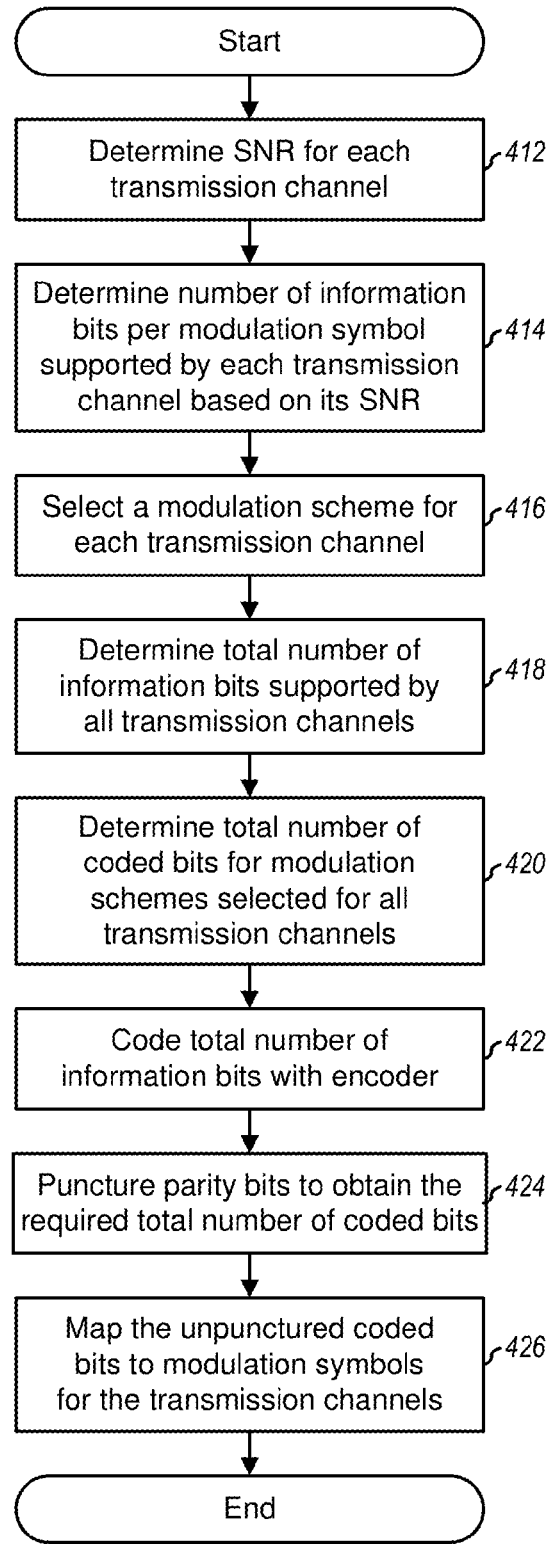
FIGS. 4A and 4B are flow diagrams of two coding/puncturing schemes for generating the required coded bits for a data transmission, which utilize a particular base code but common and variable puncturing schemes, respectively.

FIG. 4A is a flow diagram of an embodiment for generating the required coded bits for a data transmission, which employs the base code and common puncturing scheme. Initially, the SNR for each transmission channel (i.e., each eigenmode of each frequency subchannel) is determined, at step 412. For an OFDM system not operated in the MIMO mode, only one eigenmode is supported and thus only one SNR is determined for each frequency subchannel. The SNR for each transmission channel may be determined based on the transmitted pilot reference or via some other mechanism.

At step 414, the number of information bits per modulation symbol supported by each transmission channel is determined based on its SNR. A table that associates a range of SNR with each specific number of information bits/modulation symbol, such as Table 1, may be used. However, finer quantization than the 0.5-bit step size for the information bits shown in Table 1 may be used. A modulation scheme is then selected for each transmission channel such that the number of information bits/modulation symbol can be transmitted, at step 416. The modulation scheme may also be selected to take into account other factors (e.g., coding complexity), as described in further detail below.

At step 418, the total number of information bits that may be transmitted in each time slot for all transmission channels is determined. This can be achieved by summing the number of information bits/modulation symbol determined for all transmission channels. Similarly, the total number of coded bits that may be transmitted in each time slot for all transmission channels is determined, at step 420. This can be achieved by determining the number of coded bits/modulation symbol for each modulation scheme selected in step 416, and summing the number of coded bits for all transmission channels.

At step 422, the total number of information bits determined in step 418 is encoded with a particular encoder. If a Turbo encoder is used, the tail bits and parity bits generated by the encoder are punctured to obtain the total number of coded bits determined in step 420. The unpunctured coded bits are then grouped into non-binary symbols, which are then mapped to modulation symbols for the transmission channels, at step 426.

The first coding/puncturing scheme is relatively simple to implement since the same base code and puncturing scheme are used for all transmission channels. The modulation symbol for each transmission channel represents a point in a signal constellation corresponding to the modulation scheme selected for that transmission channel. If the distribution of the SNR for the transmission channels is widespread, the distance between the constellation points relative to the noise variance for different signal constellations will vary widely. This may then impact the performance of the system.

Figure 4B:
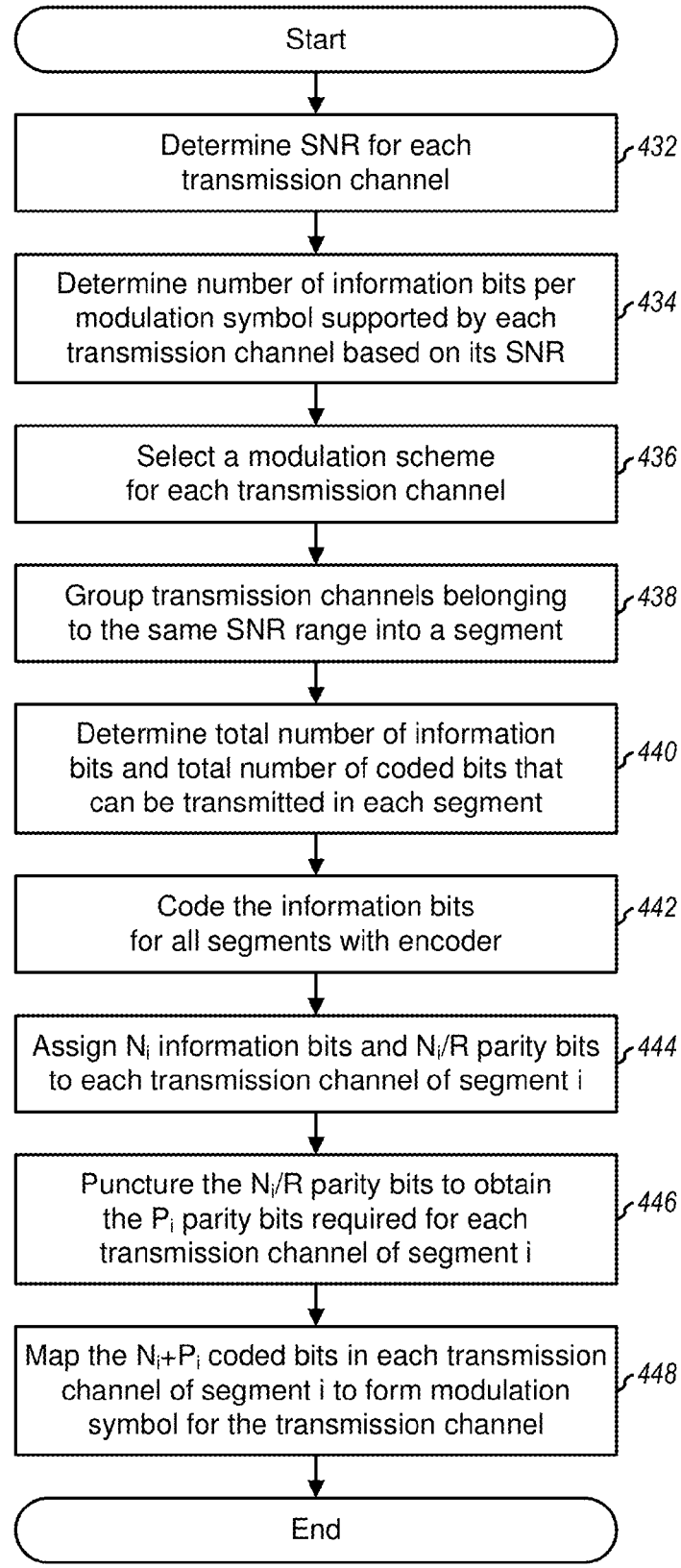

FIG. 4B is a flow diagram of an embodiment for generating the required coded bits for a data transmission, which employs the same base code but variable puncturing scheme. Initially, the SNR for each transmission channel is determined, at step 432. In an embodiment, transmission channels with insufficient SNR are omitted from use for data transmission (i.e., no data is transmitted on poor transmission channels). The number of information bits per modulation symbol supported by each transmission channel is then determined based on its SNR, at step 434. A modulation scheme is next selected for each transmission channel such that the number of information bits/modulation symbol can be transmitted, at step 436. Steps 432, 434, and 436 in FIG. 4B correspond to steps 412, 414, and 416 in FIG. 4A.

At step 438, the transmission channels belonging to the same SNR range are grouped into a segment. Alternatively, ranges can be defined for the number of information bits per modulation symbol (e.g., range 1 covering 1.0 to 1.5 information bits/modulation symbol, range 2 covering 1.5 to 2.0 information bits/modulation symbol, and so on). In this case, transmission channels having number of information bits per modulation symbol within the same range are grouped into a segment.

Each segment includes $K_i$ transmission channels, where $K_i$ can be any integer one or greater. The total number of information bits and total number of coded bits that can be transmitted in each segment are then determined, at step 440. For example, segment i may include $K_i$ transmission channels, each of which may support transmission of $N_i$ information bits/modulation symbol and $P_i$ tail and parity bits/modulation symbol. For each time slot, the total number of information bits that may be transmitted in segment i can be computed as $K_i \cdot N_i$, the total number of tail and parity bits that may be transmitted can be computed as $K_i \cdot P_i$, and the total number of coded bits may be computed as $K_i(N_i+P_i)$.

At step 442, the information bits to be transmitted in each time slot for all segments, which may be computed as $$\sum_i K_i N_i ,$$

are encoded with a particular encoder (e.g., a rate ⅓ Turbo encoder such at the one shown in FIG. 3B). At step 444, $N_i$ information bits and $N_i/R$ parity and tail bits are assigned to each transmission channel of segment i, where R is the coding rate of the encoder. The $N_i/R$ parity and tail bits are then punctured to obtain the $P_i$ parity and tail bits required for each transmission channel of the segment, at step 446. At step 448, the $N_i$ information bits and the $P_i$ parity and tail bits for each transmission channel of segment i are mapped to a modulation symbol for the transmission channel.

The second coding/puncturing scheme may provide improved performance over the first scheme, especially if the distribution of SNR for the transmission channels is widespread. Since different modulation schemes and coding rate may be used for different transmission channels, the number of bits transmitted on each transmission channel is typically communicated from the receiver to the transmitter on the reverse link.

Table 1 shows the quantization of the number of information bits/modulation symbol using 0.5-bit step size. The quantization granularity may be reduced (i.e., to be finer than 0.5-bit) if each segment (and not each transmission channel) is required to support an integer number of information bits. If $K_i \cdot N_i$ is required to be an integer, a larger integer value for $K_i$ allows for a smaller step size for $N_i$. The quantization granularity may be further reduced if the quantization is allowed to be carried from segment to segment. For example, if one bit needs to be rounded-off in one segment, one bit may be rounded-up in the next segment, if appropriate. The quantization granularity may also be reduced if the quantization is allowed to be carried over multiple time slots.

To support an OFDM system (especially one operated in the MIMO mode) whereby different SNR may be achieved for the transmission channels, a flexible puncturing scheme may be used in conjunction with a common base encoder (e.g., a rate ⅓ Turbo encoder) to achieve the necessary coding rates. This flexible puncturing scheme may be used to provide the necessary number of tail and parity bits for each segment. For a high coding rate in which more tail and parity bits are punctured than retained, the puncturing may be efficiently achieved by retaining the required number of tail and parity bits as they are generated by the encoder and discarding the others.

As an example, a segment may include 20 16-QAM modulation symbols and has a SNR that supports transmission of 2.75 information bits/modulation symbol. For this segment, 55 information bits (55=20×2.75) may be transmitted in 20 modulation symbols. Each 16-QAM modulation symbol is formed with four coded bits, and 80 coded bits are needed for 20 modulation symbols. The 55 information bits may be encoded with a rate ⅓ encoder to generate 122 tail and parity bits and 55 information bits. These 122 tail and parity bits may be punctured to provide the 35 tail and parity bits required for the segment, which in combination with the 55 information bits comprise the 80 coded bits.

Referring back to FIG. 1, puncturer 117 receives the interleaved information and parity bits from channel interleaver 116, punctures (i.e., deletes) some of the tail and parity bits to achieve the desired coding rate(s), and multiplexes the unpunctured information, tail, and parity bits into a sequence of coded bits. The information bits (which are also referred to as systematic bits) may also be punctured along with the tail and parity bits, and this is within the scope of the invention.

FIG. 3C is a diagram of an embodiment of a puncturer 117x, which may be used to provide variable puncturing of coded bits. Puncturer 117x is one implementation of puncturer 117 in FIG. 1. Using a set of counters, puncturer 117x performs puncturing to retain $P_i$ tail and parity bits out of $Q_i$ tail and parity bits generated by the encoder for segment i.

Within puncturer 117x, the interleaved tail and parity bits $y_{INT}$ and $z_{INT}$ from the two constituent encoders of the Turbo encoder are provided to two inputs of a switch 342. Switch 342 provides either the $y_{INT}$ tail and parity bits or the $z_{INT}$ tail and parity bits to line 343, depending on a control signal from a toggle unit 348. Switch 342 ensures that the tail and parity bits from the two constituent encoders are evenly selected by alternating between the two tail and parity bit streams.

A first counter 352 performs modulo-Q addition and wraps around after its content reaches beyond Q−1. A second counter 354 counts (by one) the Q tail and parity bits. For each segment, both counters 352 and 354 are initially set to zero, switch 342 is in the up position, and the first tail or parity bit $y_{INT0}$ is provided from multiplexer 346 by closing a switch 344 and appropriately controlling the multiplexer. For each subsequent clock cycle, counter 352 is incremented by P and counter 354 is incremented by one. The value of counter 352 is provided to a decision unit 356. If counter 352 experiences a modulo-Q operation (i.e., the content of counter 352 wraps around), the tail or parity bit on line 343 is provided through switch 344 to multiplexer 346, which then provides the tail or parity bit as an output coded bit. Each time a tail or parity bit is provided from multiplexer 346, toggle unit 348 toggles the state of the control signal, and the other tail and parity bit stream is provided to line 343. The process continues until all Q, tail and parity bits in the segment are exhausted, as indicated by comparison unit 358.

Other puncturing patterns may also be used and are within the scope of the invention. To provide good performance, the number of tail and parity bits to be punctured should be balanced between the two constituent codes (i.e., approximately equal number of $p_{INT}$ and $z_{INT}$ tail and parity bits are selected) and the unpunctured bits should be distributed relatively evenly over the code block for each segment.

In certain instances, the number of information bits may be less than the capacity of the transmission channels. In such instances, the available and unfilled bit positions may be filled with zero padding, by repeating some of the coded bits, or by some other scheme. The transmit power may also be reduced for some schemes.

Gray Mapping

In an embodiment, for each modulation scheme (e.g., QPSK, 16-QAM, 64-QAM, and so on) selected for use, the points in the signal constellation for the modulation scheme are defined using Gray mapping. The Gray mapping reduces the number of bit errors for more likely error events, as described in further detail below.

Figure 5:
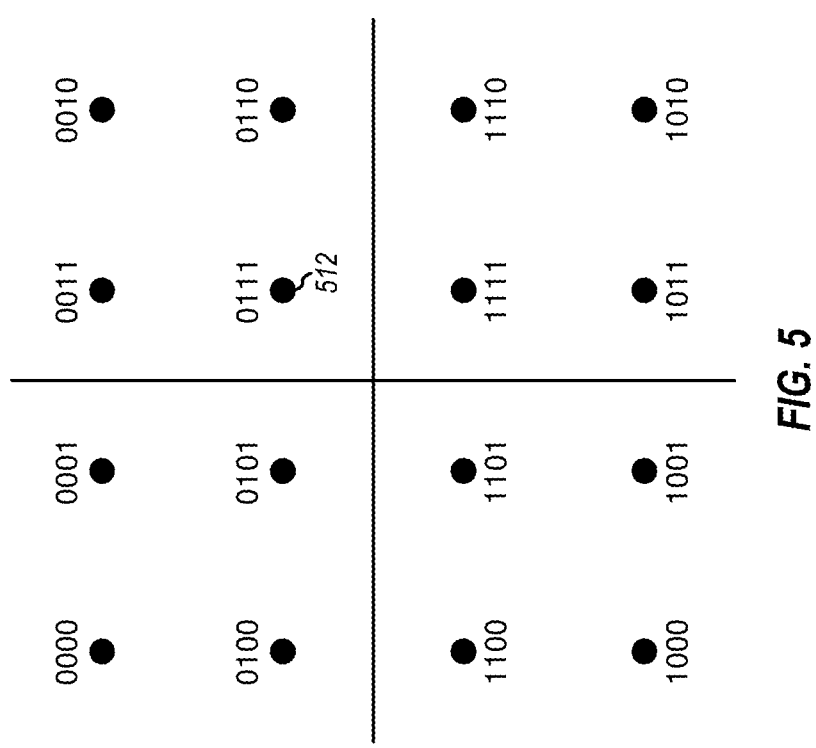
FIG. 5 is a diagram of a signal constellation for 16-QAM and a specific Gray mapping scheme.

FIG. 5 is a diagram of a signal constellation for 16-QAM and a specific Gray mapping scheme. The signal constellation for 16-QAM includes 16 points, each of which is associated with a specific 4-bit value. For Gray mapping, the 4-bit values are associated with the points in the signal constellation such that the values for adjacent points (in the horizontal or vertical direction) differ by only one bit position. The values for points further way differ by more bit positions (e.g., the values for adjacent points in the diagonal direction differ by two bit positions).

Each group of four coded bits ($b_1$ $b_2$ $b_3$ $b_4$) is mapped to a specific point in the signal constellation associated with the same value as that of the four coded bits. For example, a value of ("0111") for the four coded bits is mapped to a point 512 in the signal constellation. This point then represents the modulation symbol for the four coded bits. For 16-QAM, each modulation symbol represents a specific one of the 16 points in the signal constellation, with the specific point being determined by the value of the four coded bits. Each modulation symbol can be expressed as a complex number (c+jd) and provided to the next processing element (i.e., MIMO processor 120 in FIG. 1).

At the receiver unit, the modulation symbols are received in the presence of noise and typically do not map to the exact location in the signal constellation. For the above example, the received modulation symbol for the transmitted coded bits ("0111") may not map to point 512 at the receiver unit. The noise may have caused the received modulation symbol to be mapped to another location in the signal constellation. Typically, there is greater likelihood of the received modulation symbol being mapped to a location near the correct location (e.g., near the points for "0101", "0011", "0110", or "1111"). Thus, the more likely error event is a received modulation symbol being erroneously mapped to a point adjacent to the correct point. And since adjacent points in the signal constellation have values that differ by only one bit position, the Gray mapping reduces the number of error bits for more likely error events.

FIG. 5 shows a specific Gray mapping scheme for the 16-QAM signal constellation. Other Gray mapping schemes may also be used and are within the scope of the invention. The signal constellations for other modulation schemes (e.g., 8-PSK, 64-QAM, and so on) may also be mapped with similar or other Gray mapping schemes. For some modulation schemes such as 32-QAM and 128-QAM, a partial Gray mapping scheme may be used if a full Gray mapping scheme is not possible. Also, mapping schemes not based on Gray mapping may also be used and are within the scope of the invention.

MIMO Processing

Figure 6:
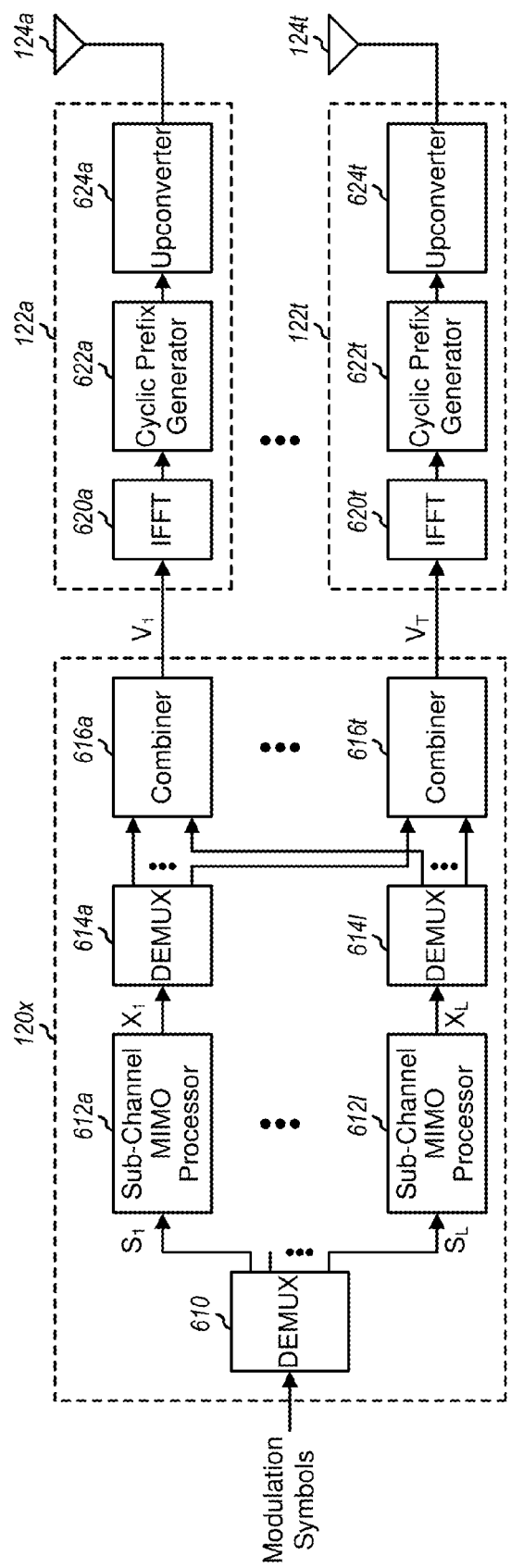
FIG. 6 is a block diagram of an embodiment of a MIMO processor.

FIG. 6 is a block diagram of an embodiment of a MIMO processor 120x, which is one implementation of MIMO processor 120 in FIG. 1. The modulation symbols may be transmitted on multiple frequency subchannels and possibly from multiple transmit antennas. When operating in the MIMO mode, the transmission on each frequency subchannel and from each transmit antenna represents non-duplicated data.

Within MIMO processor 120x, a demultiplexer (DEMUX) 610 receives and demultiplexes the modulation symbols into a number of subchannel symbol streams, $S_1$ through $S_L$, one subchannel symbol stream for each frequency subchannel used to transmit the symbols. Each subchannel symbol stream is then provided to a respective subchannel MIMO processor 612.

Each subchannel MIMO processor 612 may further demultiplex the received subchannel symbol stream into a number of (up to $N_T$) symbol sub-streams, one symbol sub-stream for each antenna used to transmit the modulation symbols. When the OFDM system is operated in the MIMO mode, each subchannel MIMO processors 612 pre-conditions the (up to) $N_T$ modulation symbols in accordance with equation (1) described above to generate pre-conditioned modulation symbols, which are subsequently transmitted. In the MIMO mode, each pre-conditioned modulation symbol for a particular frequency subchannel of a particular transmit antenna represents a linear combination of (weighted) modulation symbols for up to $N_T$ transmit antennas. Each of the (up to) $N_T$ modulation symbols used to generate each pre-conditioned modulation symbol may be associated with a different signal constellation.

For each time slot, (up to) $N_T$ pre-conditioned modulation symbols may be generated by each subchannel MIMO processor 612 and provided to (up to) $N_T$ symbol combiners 616a through 616t. For example, subchannel MIMO processor 614a assigned to frequency subchannel 1 may provide up to $N_T$ pre-conditioned modulation symbols for frequency subchannel 1 of antennas 1 through $N_T$. Similarly, subchannel MIMO processor 6121 assigned to frequency subchannel L may provide up to $N_T$ symbols for frequency subchannel L of antennas 1 through $N_T$. Each combiner 616 receives the pre-conditioned modulation symbols for the L frequency subchannels, combines the symbols for each time slot into a modulation symbol vector, V, and provides the modulation symbol vector to the next processing stage (i.e., modulator 122).

MIMO processor 120x thus receives and processes the modulation symbols to provide $N_T$ modulation symbol vectors, $V_1$ through $V_T$, one modulation symbol vector for each transmit antenna. The collection of L pre-conditioned modulation symbols for each time slot of each antenna form a modulation symbol vector V of dimensionality L. Each element of the modulation symbol vector V is associated with a specific frequency subchannel having a unique subcarrier on which the modulation symbol is conveyed. The collection of the L modulation symbols are all orthogonal to one another. If not operating in a "pure" MIMO mode, some of the modulation symbol vectors may have duplicate information on specific frequency subchannels for different transmit antennas.

Subchannel MIMO processor 612 may be designed to provide the necessary processing to implement full channel state information (full-CSI) or partial-CSI processing for the MIMO mode. Full CSI includes sufficient characterization of the propagation path (i.e., amplitude and phase) between all pairs of transmit and receive antennas for each frequency subchannel. Partial CSI may include, for example, the SNR of the spatial subchannels. The CSI processing may be performed based on the available CSI information and on the selected frequency subchannels, transmit antennas, and so on. The CSI processing may also be enabled and disabled selectively and dynamically. For example, the CSI processing may be enabled for a particular data transmission and disabled for some other data transmissions. The CSI processing may be enabled under certain conditions, for example, when the communication link has adequate SNR. Full-CSI and partial-CSI processing is described in further detail in the aforementioned U.S. patent application Ser. No. 09/532,491.

FIG. 6 also shows an embodiment of modulator 122. The modulation symbol vectors $V_1$ through $V_T$ from MIMO processor 120x are provided to modulators 114a through 114t, respectively. In the embodiment shown in FIG. 6, each modulator 114 includes an IFFT 620, cycle prefix generator 622, and an upconverter 624.

IFFT 620 converts each received modulation symbol vector into its time-domain representation (which is referred to as an OFDM symbol) using the inverse fast Fourier transform (IFFT). IFFT 620 can be designed to perform the IFFT on any number of frequency subchannels (e.g., 8, 16, 32, and so on). In an embodiment, for each modulation symbol vector converted to an OFDM symbol, cycle prefix generator 622 repeats a portion of the time-domain representation of the OFDM symbol to form a transmission symbol for the specific antenna. The cyclic prefix insures that the transmission symbol retains its orthogonal properties in the presence of multipath delay spread, thereby improving performance against deleterious path effects. The implementation of IFFT 620 and cycle prefix generator 622 is known in the art and not described in detail herein.

The time-domain representations from each cycle prefix generator 622 (i.e., the "transmission" symbols for each antenna) are then processed by upconverter 624, converted into an analog signal, modulated to a RF frequency, and conditioned (e.g., amplified and filtered) to generate an RF modulated signal, which is then transmitted from the respective antenna 124.

OFDM modulation is described in further detail in a paper entitled "Multicarrier Modulation for Data Transmission: An Idea Whose Time Has Come," by John A. C. Bingham, IEEE Communications Magazine, May 1990, which is incorporated herein by reference.

For an OFDM system not operated in the MIMO mode, MIMO processor 120 may be removed or disabled and the modulation symbols may be grouped into the modulation symbol vector V without any pre-conditioning. This vector is then provided to modulator 122. And for an OFDM system operated with transmit diversity (and not in the MIMO mode), demultiplexer 614 may be removed or disabled and the (same) pre-conditioned modulation symbols are provided to (up to) $N_T$ combiners.

As shown in FIG. 2, a number of different transmissions (e.g., voice, signaling, data, pilot, and so on) may be transmitted by the system. Each of these transmissions may require different processing.

Figure 7:
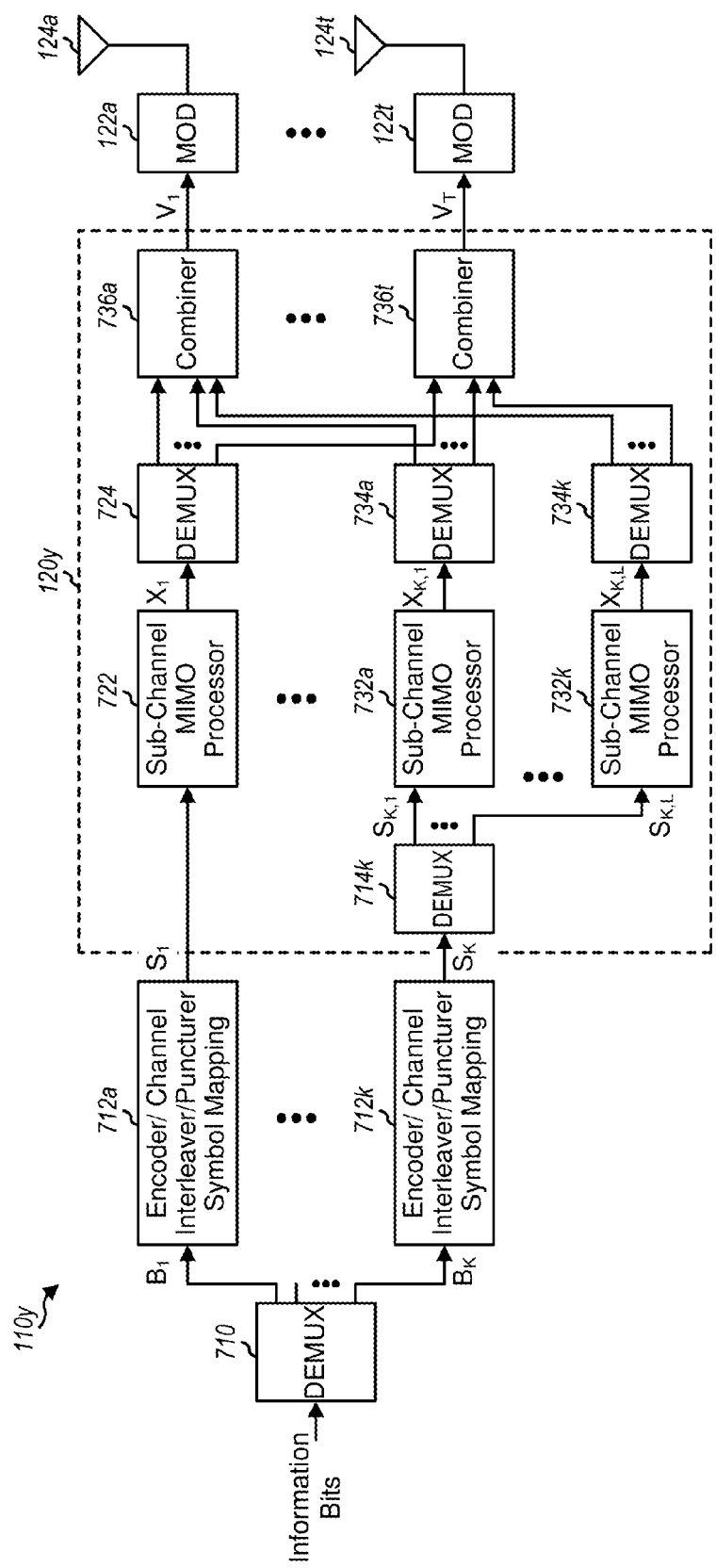
FIG. 7 is a block diagram of an embodiment of a system capable of providing different processing for different transmissions.

FIG. 7 is a block diagram of an embodiment of a system 110y capable of providing different processing for different transmissions. The aggregate input data, which includes all information bits to be transmitted by system 110y, is provided to a demultiplexer 710. Demultiplexer 710 demultiplexes the input data into a number of (K) channel data streams, $B_1$ through $B_K$. Each channel data stream may correspond to, for example, a signaling channel, a broadcast channel, a voice call, or a traffic data transmission. Each channel data stream is provided to a respective encoder/channel interleaver/puncturer/symbol mapping element 712 that encodes the data using a particular encoding scheme selected for that channel data stream, interleaves the encoded data based on a particular interleaving scheme, punctures the interleaved code bits, and maps the interleaved data into modulation symbols for the one or more transmission channels used for transmitting that channel data stream.

The encoding can be performed on a per channel basis (i.e., on each channel data stream, as shown in FIG. 7). However, the encoding may also be performed on the aggregate input data (as shown in FIG. 1), on a number of channel data streams, on a portion of a channel data stream, across a set of frequency subchannels, across a set of spatial subchannels, across a set of frequency subchannels and spatial subchannels, across each frequency subchannel, on each modulation symbol, or on some other unit of time, space, and frequency.

The modulation symbol stream from each encoder/channel interleaver/puncturer/symbol mapping element 712 may be transmitted on one or more frequency subchannels and via one or more spatial subchannels of each frequency subchannel. A MIMO processor 120y receives the modulation symbol streams from elements 712. Depending on the mode to be used for each modulation symbol stream, MIMO processor 120y may demultiplex the modulation symbol stream into a number of subchannel symbol streams. In the embodiment shown in FIG. 7, modulation symbol stream $S_1$ is transmitted on one frequency subchannel and modulation symbol stream $S_K$ is transmitted on L frequency subchannels. The modulation stream for each frequency subchannel is processed by a respective subchannel MIMO processor, demultiplexed, and combined in similar manner as that described in FIG. 6 to form a modulation symbol vector for each transmit antenna.

In general, the transmitter unit codes and modulates data for each transmission channel based on information descriptive of the channel's transmission capability. This information is typically in the form of partial-CSI or full-CSI described above. The partial or full-CSI for the transmission channels to be used for a data transmission is typically determined at the receiver unit and reported back to the transmitter unit, which then uses the information to code and modulate data accordingly. The techniques described herein are applicable for multiple parallel transmission channels supported by MIMO, OFDM, or any other communication scheme (e.g., a CDMA scheme) capable of supporting multiple parallel transmission channels.

Demodulation and Decoding

Figure 8:
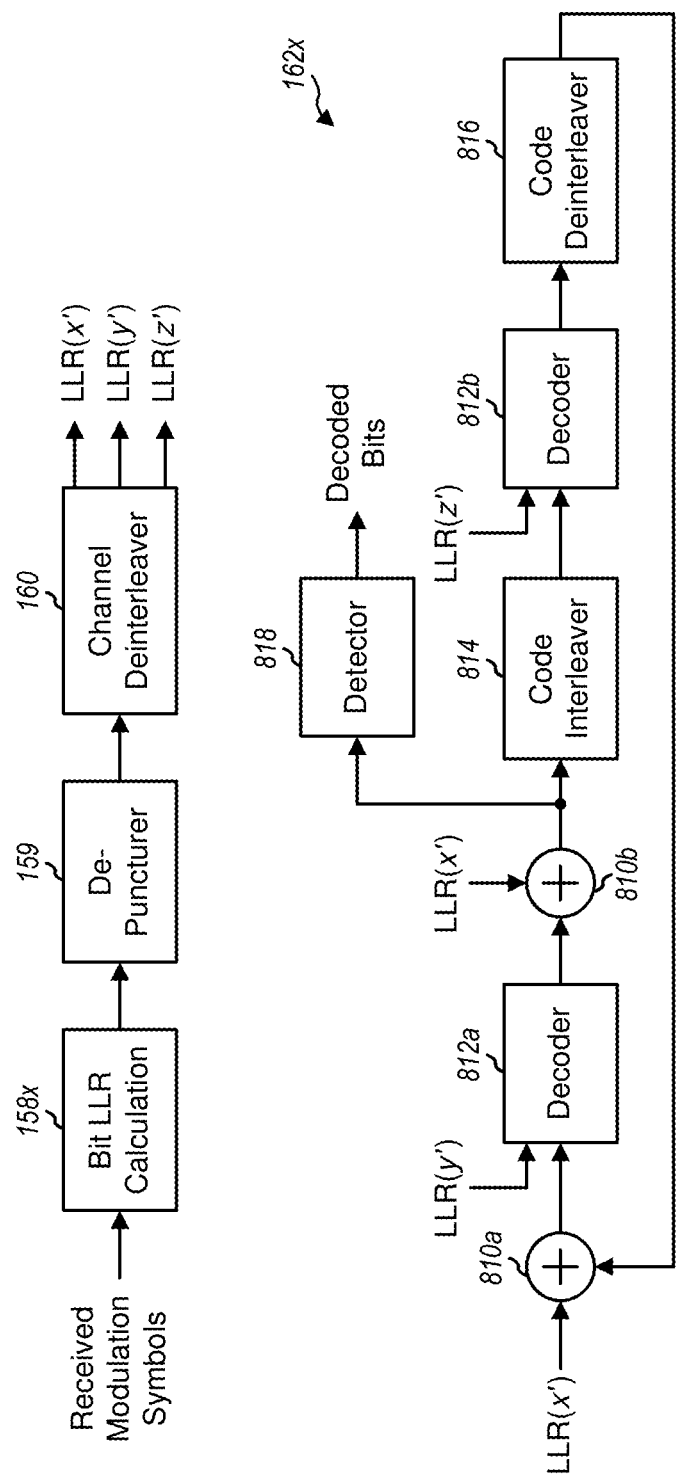
FIG. 8 is a block diagram of an embodiment of the decoding portion of a receiving system.

FIG. 8 is a block diagram of an embodiment of a decoding portion of system 150. For this embodiment, a Turbo encoder is used to encode the data prior to transmission. A Turbo decoder is correspondingly used to decode the received modulation symbols.

As shown in FIG. 8, the received modulation symbols are provided to a bit log-likelihood ratio (LLR) calculation unit 158x, which calculates the LLRs of the bits that make up each modulation symbol. Since a Turbo decoder operates on LLRs (as oppose to bits), bit LLR calculation unit 158x provides an LLR for each received coded bit. The LLR for each received coded bit is the logarithm of the probability that the received coded bit is a zero divided by the probability that the received coded bit is a one.

As described above, M coded bits ($b_1, b_2, \ldots b_M$) are grouped to form a single non-binary symbol S, which is then mapped to a modulation symbol T(S) (i.e., modulated to a high-order signal constellation). The modulation symbol is processed, transmitted, received, and further processed to provide a received modulation symbol R(S). The LLR of coded bit $b_m$ in the received modulation symbol can be computed as:

$$LLR(b_m) = \log\left(\frac{P(b_m = 0)}{P(b_m = 1)}\right) \quad \text{Eq (2)}$$
$$= \log(P(R(S) | b_m = 0)) - \log(P(R(S) | b_m = 1))$$
$$= \log\left(\sum_{T(S):b_m=0} P(R(S) | T(S))\right) - \log\left(\sum_{T(S):b_m=1} P(R(S) | T(S))\right)$$

where $P(R(S)|b_m=0)$ is the probability of bit $b_m$ being a zero based on the received symbol R(S). Approximations may also be used in computing the LLRs.

De-puncturer 159 then inserts "erasures" for code bits that have been deleted (i.e., punctured) at the transmitter. The erasures typically have a value of zero ("0"), which is indicative of the punctured bit being equally likely to be a zero or a one.

From equation (2), it can be noted that the LLRs for the received coded bits within a modulation symbol tend to be correlated. This correlation can be broken up by interleaving the coded bits prior to modulation. As shown in FIG. 1, the channel interleaving advantageously performs the decorrelation of the coded bits in each modulation symbol.

The coded bit LLRs are provided to a channel deinterleaver 160 and deinterleaved in a manner complementary to the channel interleaving performed at the transmitter. The channel deinterleaved LLRs corresponding to the received information, tail, and parity bits are then provided to a Turbo decoder 162x.

Turbo decoder 162x includes summers 810a and 810b, decoders 812a and 812b, a code interleaver 814, a code deinterleaver 816, and a detector 818. In an embodiment, each decoder 812 is implemented as a soft-input/soft-output (SISO) maximum a posterior (MAP) decoder.

Summer 810a receives and sums the LLRs of the received information bits, LLR(x'), and the extrinsic information from deinterleaver 816 (which is set to zeros on the first iteration), and provides refined LLRs. The refined LLRs are associated with greater confidence in the detected values of the received information bits.

Decoder 812a receives the refined LLRs from summer 810a and the LLRs of the received tail and parity bits from the first constituent encoder, LLR(y'), and decodes the received LLRs to generate extrinsic information indicative of corrections in the probability values for the received information bits. The extrinsic information from decoder 812a are summed with the received information bit LLRs by summer 810b, and the refined LLRs are stored to code interleaver 814. Code interleaver 814 implements the same code interleaving used at the Turbo encoder (e.g., the same as code interleaver 314 in FIG. 3B).

Decoder 812b receives the interleaved LLRs from interleaver 814 and the LLRs of the received tail and parity bits from the second constituent encoder, LLR(z'), and decodes the received LLRs to generate extrinsic information indicative of further corrections in the probability values for the received information bits. The extrinsic information from decoder 812b is stored to code deinterleaver 816, which implements a deinterleaving scheme complementary to the interleaving scheme used for interleaver 814.

The decoding of the received coded bit LLRs is iterated a number of times. With each iteration, greater confidence is gained for the refined LLRs. After all the decoding iterations have been completed, the final refined LLRs are provided to detector 818, which provides values for the received information bits based on the LLRs.

Other types of decoder may also be used beside the SISO MAP decoder such as one that implements the soft output Viterbi algorithm (SOVA). The design of the decoder is typically dependent on the particular Turbo coding scheme used at the transmitter.

Turbo decoding is described in greater detail by Steven S. Pietrobon in a paper entitled "Implementation and Performance of a Turbo/Map Decoder," International Journal of Satellite Communications, Vol. 16, 1998, pp. 23-46, which is incorporated herein by reference.

Modulation Scheme and Coding Rate

The achieved SNR of each transmission channel supports a particular number of information bits per modulation symbol (i.e., a particular information bit rate) for a desired level of performance (e.g., 1% FER). This information bit rate may be supported by a number of different modulation schemes. For example, a bit rate of 1.5 information bits/modulation symbol may be supported by QPSK, 8-PSK, 16-QAM, or any higher order modulation scheme. Each modulation scheme is able to transmit a particular number of coded bits per modulation symbol.

Depending on the selected modulation scheme, a corresponding coding rate is selected such that the required number of coded bits is provided for the number of information bits for each modulation symbol. For the above example, QPSK, 8-PSK, and 16-QAM are respectively able to transmit 2, 3, and 4 coded bits per modulation symbol. For an information bit rate of 1.5 information bits/modulation symbol, coding rates of ¾, ½, and ⅜ are used to generate the required number of coded bits for QPSK, 8-PSK, and 16-QAM, respectively. Thus, different combinations of modulation scheme and coding rate may be used to support a particular information bit rate.

In certain embodiments of the invention, a "weak" binary code (i.e., a high coding rate) is used in conjunction with a low-order modulation scheme for the supported bit rate. Through a series of simulation, it is observed that a lower order modulation scheme in combination with a weaker code may offer better performance than a higher order modulation scheme with a stronger code. This result may be explained as follows. The LLR decoding metrics of binary Turbo codes in an AWGN channel is near optimal for the Turbo decoding algorithm. However, for the Gray mapped high-order modulation scheme, the optimal LLR metrics are generated for each received modulation symbol and not each received bit. The symbol LLR metrics are then broken to yield bit LLR metrics for the binary code decoder. Some information is lost during the break-up process, and using the bit decoding metrics may result in non-optimal performance. The lower order modulation schemes correspond to fewer bits per symbol, which may experience less of the break-up loss and therefore provide better performance than the higher order modulation scheme counterparts.

In accordance with an aspect of the invention, in order to achieve certain spectrum efficiency, a code with a coding rate of between, and inclusive of, $n/(n+1)$ to $n/(n+2)$ is used with an appropriate modulation scheme, where n is the number of information bits per modulation symbol. This coding rate may be easily achieved with a fixed code (e.g., the rate $\frac{1}{3}$ Turbo code described above) in combination with a variable puncturing scheme. To achieve a high coding rate, the tail and parity bits may be heavily punctured and the unpunctured tail and parity bits may be evenly distributed over the information bits.

Framing

For many communication systems, it is convenient to define data packets (i.e., logical frames) with fixed sizes. For example, a system may define three different packets having sizes of 1024, 2048, and 4096 bits. These defined data packets simplify some of the processing at both the transmitter and receiver.

For an OFDM system, a physical frame may be defined to include (1) an integer number of OFDM symbols, (2) a particular number of modulation symbols on one or more transmission channels, (3) or some other units. As described above, because of the time-variant nature of the communication link, the SNR of the transmission channels may vary over time. Consequently, the number of information bits which may be transmitted on each time slot for each transmission channel will likely vary over time, and the number of information bits in each physical frame will also likely vary over time.

In one embodiment, a logical frame is defined such that it is independent of the OFDM symbols. In this embodiment, the information bits for each logical frame are encoded/punctured, and the coded bits for the logical frame are grouped and mapped to modulation symbols. In one simple implementation, the transmission channels are sequentially numbered. The coded bits are then used to form as many modulation symbols as needed, in the sequential order of the transmission channels. A logical frame (i.e., a data packet) may be defined to start and end at modulation symbol boundaries. In this implementation, the logical frame may span more than one OFDM symbol and may further cross OFDM symbol boundaries. Moreover, each OFDM symbol may include coded bits from multiple data packets.

In another embodiment, a logical frame is defined based on a physical unit. For example, a logical frame may be defined to include (1) a number of modulation symbols on one or more transmission channels, (2) one or more OFDM symbols, or (3) a number of modulation symbols defined in some other manner.

The use of punctured binary Turbo code and Gray mapping (BTC-GM) for high-order modulation provides numerous advantages. The BTC-GM scheme is simpler to implement than the more optimal but more complicated Turbo trellis coded modulation (TTCM) scheme, yet can achieve performance close to that of TTCM. The BTC-GM scheme also provides a high degree of flexibility because of the ease of implementing different coding rate by simply adjusting the variable puncturing. The BTC-GM scheme also provides robust performance under different puncturing parameters. Also, currently available binary Turbo decoders may be used, which may simply the implementation of the receiver. However, in certain embodiments, other coding schemes may also be used and are within the scope of the invention.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. In a wireless communication system, a method for processing received data, the method comprising:
   generating a plurality of log likelihood ratio (LLR) streams based on a plurality of received modulation symbols;
   processing each of the plurality of LLR streams to obtain a plurality of processed LLR streams, wherein processing each of the plurality of LLR streams comprises either depuncturing each of the plurality of LLR streams to obtain a plurality of depunctured LLR streams and deinterleaving each of the plurality of depunctured LLR streams into the plurality of processed LLR streams, or deinterleaving each of the plurality of LLR streams into a plurality of deinterleaved LLR streams and depuncturing each of the plurality of deinterleaved LLR streams to obtain the plurality of processed LLR streams; and
   decoding each of the plurality of processed LLR streams to obtain a plurality of information bit streams.

2. The method of claim 1, wherein depuncturing is performed on a plurality of tail and parity bits in the plurality of received modulation symbols.

3. The method of claim 2, wherein depuncturing is performed on tail and parity bits of the plurality of tail and parity bits that are evenly distributed over the plurality of received modulation symbols.

4. The method of claim 1, wherein the wireless communication system comprises a multiple-input multiple-output (MIMO) communication system with a plurality of transmit antennas and a plurality of receive antennas.

5. The method of claim 1, wherein the wireless communication system comprises an orthogonal frequency division multiplexing (OFDM) communication system.

6. The method of claim 5, wherein the OFDM communication system is operated as a multiple-input multiple-output (MIMO) communication system with a plurality of transmit antennas and a plurality of receive antennas.

7. The method of claim 6, wherein the OFDM communication system is operative to transmit data on a plurality of frequency subchannels, and wherein each frequency subchannel corresponds to a spatial subchannel of a frequency subchannel in the OFDM communication system.

8. The method of claim 1, decoding is achieved via a Turbo decoder.

9. A wireless communication device operative to process received data, the wireless communication device comprising:
  means for generating a plurality of log likelihood ratio (LLR) streams based on a plurality of received modulation symbols;
  means for processing each of the plurality of LLR streams to obtain a plurality of processed LLR streams, wherein the means for processing each of the plurality of LLR streams comprises either means for depuncturing each of the plurality of LLR streams to obtain a plurality of depunctured LLR streams and deinterleaving each of the plurality of depunctured LLR streams into the plurality of processed LLR streams, or means for deinterleaving each of the plurality of LLR streams into a plurality of deinterleaved LLR streams and depuncturing each of the plurality of deinterleaved LLR streams to obtain the plurality of processed LLR streams; and
  means for decoding each of the plurality of processed LLR streams to obtain a plurality of information bit streams.

10. The wireless communication device of claim 9, wherein the means for depuncturing each of the plurality of LLR streams to obtain a plurality of depunctured LLR streams comprises means for depuncturing on a plurality of tail and parity bits in the plurality of received modulation symbols.

11. The wireless communication device of claim 10, wherein the means for depuncturing each of the plurality of LLR streams to obtain a plurality of depunctured LLR streams comprises means for depuncturing on tail and parity bits of the plurality of tail and parity bits that are evenly distributed over the plurality of received modulation symbols.

12. The wireless communication device of claim 9, wherein the wireless communication device comprises a multiple-input multiple-output (MIMO) communication device with a plurality of transmit antennas and a plurality of receive antennas.

13. The wireless communication device of claim 9, wherein the wireless communication device comprises an orthogonal frequency division multiplexing (OFDM) communication device.

14. The wireless communication device of claim 13, wherein the OFDM communication device is operated as a multiple-input multiple-output (MIMO) communication system with a plurality of transmit antennas and a plurality of receive antennas.

15. The wireless communication device of claim 14, wherein the OFDM communication device is operative to transmit data on a plurality of frequency subchannels, and wherein each transmission channel corresponds to a spatial subchannel of a frequency subchannel in the OFDM communication device.

16. The wireless communication device of claim 9, wherein the means for decoding comprises a Turbo decoder.

17. A wireless communication device operative to process received data, the wireless communication device comprising:
  a coded bit generator configured to generate a plurality of log likelihood ratio (LLR) streams based on a plurality of received modulation symbols;
  a processor configured to process each of the plurality of LLR streams to obtain a plurality of processed LLR streams, wherein the processor comprises either a depuncturer configured to depuncture each of the plurality of LLR streams to obtain a plurality of depunctured LLR streams and a deinterleaver configured to deinterleave each of the plurality of depunctured LLR streams into the plurality of processed LLR streams, or a deinterleaver configured to deinterleave each of the plurality of LLR streams into a plurality of deinterleaved LLR streams and a depuncturer configured to depuncture each of the plurality of deinterleaved LLR streams to obtain the plurality of processed LLR streams; and
  a decoder configured to decode each of the plurality of processed LLR streams to obtain a plurality of information bit streams.

18. The wireless communication device of claim 17, wherein the depuncturer is configured to depuncture on a plurality of tail and parity bits in the plurality of received modulation symbols.

19. The wireless communication device of claim 18, wherein the depuncturer is configured to depuncture on tail and parity bits of the plurality of tail and parity bits that are evenly distributed over the plurality of received modulation symbols.

20. The wireless communication device of claim 17, wherein the wireless communication device comprises a multiple-input multiple-output (MIMO) communication device with a plurality of transmit antennas and a plurality of receive antennas.

21. The wireless communication device of claim 17, wherein the wireless communication device comprises an orthogonal frequency division multiplexing (OFDM) communication device.

22. The wireless communication device of claim 21, wherein the OFDM communication device is operated as a multiple-input multiple-output (MIMO) communication system with a plurality of transmit antennas and a plurality of receive antennas.

23. The wireless communication device of claim 22, wherein the OFDM communication device is operative to transmit data on a plurality of frequency subchannels, and wherein each transmission channel corresponds to a spatial subchannel of a frequency subchannel in the OFDM communication device.

24. The wireless communication device of claim 17, wherein the decoder comprises a Turbo decoder.

25. A non-transitory computer-readable medium in a wireless communication device comprising instructions for causing a computer or processor to perform a method to process received data, the instructions comprising instructions to:
  generate a plurality of log likelihood ratio (LLR) streams based on a plurality of received modulation symbols;
  process each of the plurality of LLR streams to obtain a plurality of processed LLR streams, wherein the instructions to process each of the plurality of LLR streams comprises either instructions to depuncture each of the plurality of LLR streams to obtain a plurality of depunctured LLR streams and deinterleave each of the plurality of depunctured LLR streams into the plurality of processed LLR streams, or instructions to deinterleave each of the plurality of LLR streams into a plurality of deinterleaved LLR streams and depuncture each of the plurality of deinterleaved LLR streams to obtain the plurality of processed LLR streams; and decode each of the plurality of processed LLR streams to obtain a plurality of information bit streams.

26. The non-transitory computer-readable medium of claim 25, wherein the instruction to depuncture each of the plurality of LLR streams to obtain a plurality of depunctured LLR streams comprises an instruction to depuncture on a plurality of tail and parity bits in the plurality of received modulation symbols.

27. The non-transitory computer-readable medium of claim 26, wherein the plurality of tail and parity bits are evenly distributed over the plurality of received modulation symbols.

28. The non-transitory computer-readable medium of claim 25, wherein the wireless communication device comprises a multiple-input multiple-output (MIMO) communication device with a plurality of transmit antennas and a plurality of receive antennas.

29. The non-transitory computer-readable medium of claim 25, wherein the wireless communication device comprises an orthogonal frequency division multiplexing (OFDM) communication device.

30. The non-transitory computer-readable medium of claim 29, wherein the OFDM communication device is operated as a multiple-input multiple-output (MIMO) communication system with a plurality of transmit antennas and a plurality of receive antennas.

31. The non-transitory computer-readable medium of claim 30, wherein the OFDM communication device is operative to transmit data on a plurality of frequency sub-channels, and wherein each transmission channel corresponds to a spatial subchannel of a frequency subchannel in the OFDM communication device.

32. The non-transitory computer-readable medium of claim 25, wherein the instruction to decode each of the plurality of processed LLR streams to obtain a plurality of information bit streams is performed by a Turbo decoder.

* * * * *